(12) United States Patent
Voigt et al.

(10) Patent No.: US 11,383,625 B2
(45) Date of Patent: Jul. 12, 2022

(54) MOLD-IN FASTENERS

(71) Applicant: Velcro IP Holdings LLC, Manchester, NH (US)

(72) Inventors: Paul Joseph Voigt, Waterdown (CA); Victor Horst Kheil, Kitchener (CA)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 17/242,346

(22) Filed: Apr. 28, 2021

(65) Prior Publication Data

US 2021/0339664 A1  Nov. 4, 2021

Related U.S. Application Data

(60) Provisional application No. 63/017,020, filed on Apr. 29, 2020.

(51) Int. Cl.
*A44B 18/00* (2006.01)
*B60N 2/58* (2006.01)

(52) U.S. Cl.
CPC ......... *B60N 2/5833* (2013.01); *B60N 2/5891* (2013.01); *A44B 18/00* (2013.01); *Y10T 428/24017* (2015.01)

(58) Field of Classification Search
None
See application file for complete search history.

(56) References Cited

U.S. PATENT DOCUMENTS

| 4,784,890 A | 11/1988 | Black |
| 4,931,344 A | 6/1990 | Ogawa et al. |
| 5,606,781 A | 3/1997 | Provost et al. |
| 6,248,419 B1 | 6/2001 | Kennedy et al. |
| 7,048,818 B2 | 5/2006 | Krantz et al. |
| 7,807,244 B2 | 10/2010 | Line |

(Continued)

FOREIGN PATENT DOCUMENTS

| EP | 0912364 | 10/2001 |
| JP | H05211909 | 8/1993 |

OTHER PUBLICATIONS

Hanescompanies.com [online], "Hanes Companies," available on or before Jan. 6, 2006, via Internet Archive Wayback Machine URL<https://web.archive.org/web/20060110230639/https://hanescompanies.com/>, retrieved on Oct. 22, 2021, URL<https://hanescompanies.com/>, 3 pages.

(Continued)

*Primary Examiner* — Alexander S Thomas
(74) *Attorney, Agent, or Firm* — Fish & Richardson P.C.

(57) ABSTRACT

A mold in fastener product includes a flexible substrate, such as a resin film or textile sheet, and a resin layer covering only part of one side of the flexible substrate and leaving a region of the one side of the flexible substrate exposed, the resin layer carrying multiple touch fastener elements each having a resin stem extending integrally from the layer away from the flexible substrate to an engageable head. A flexible ferromagnetic strip is bonded to the flexible substrate and at least partially bounds a bounded portion of the flexible substrate containing at least some of the touch fastener elements and at least a part of the exposed region. The product is preferably wide, such as to cover a wide concave region of a foam seat cushion.

25 Claims, 14 Drawing Sheets

(56) References Cited

U.S. PATENT DOCUMENTS

| | | |
|---|---|---|
| 9,958,070 B2 | 5/2018 | Cornu et al. |
| 10,405,614 B2 | 9/2019 | Rocha |
| 10,421,414 B2 | 9/2019 | Townlet et al. |
| 2011/0167598 A1* | 7/2011 | Cheng .................. B60N 2/5833 24/306 |
| 2016/0207432 A1 | 7/2016 | Teoh et al. |
| 2017/0240081 A1 | 8/2017 | Cheng |

OTHER PUBLICATIONS

International Search Report and Written Opinion in International Application. No. PCT/US2021/029576, dated Aug. 3, 2021, 14 pages.

\* cited by examiner

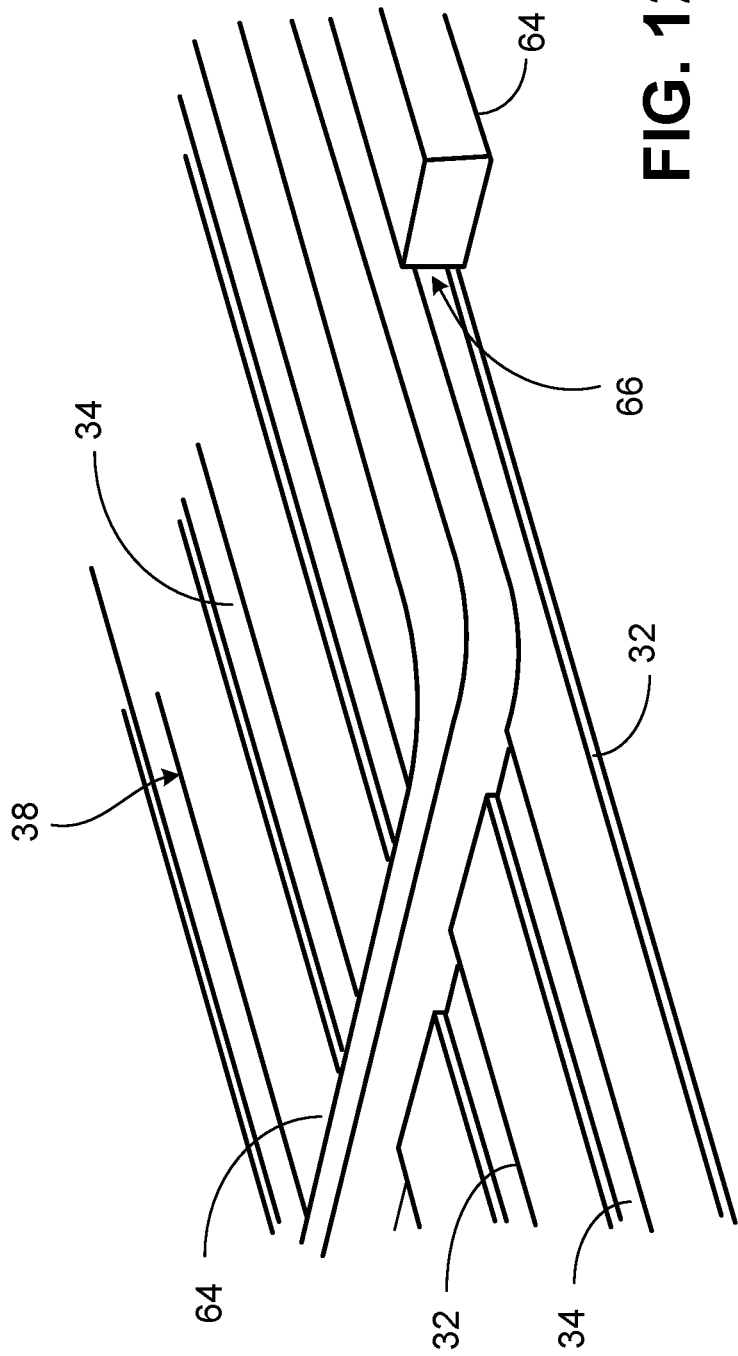

US 11,383,625 B2

MOLD-IN FASTENERS

TECHNICAL FIELD

This invention relates to mold-in fastener products and methods of making and using such products.

BACKGROUND

Separable fasteners are used in the manufacture of automobile seats in the attachment of an upholstered seat cover, sometimes called a trim cover, to a polyurethane foam bun. One portion of the separable fastener is incorporated into the surface of the polyurethane seat bun during the foam molding process, and is often referred to as a 'mold-in' product, in that it is molded into the foam. The mating portion of the separable fastener is attached to the seat cover to provide releasable attachment to the foam seat bun. The separable fastener assembly used in the foam mold for incorporation in the bun surface typically is the hooked portion of the separable fastener system. This hook portion has a base carrying resilient fastener elements or hooks on one surface. The surface of the base obverse of the hook-carrying surface may act as an anchoring surface by a variety of configurations well known in the art. In some assemblies a magnetically attractive material is attached to the base to facilitate placement of the assembly in a trough of the mold cavity wall, which is equipped with magnets. A protective layer, often in the form of a thin plastic film, is placed over the resilient hooks, or a gasket provided around the hooks, to prevent incursion of foam into the hooks during the molding process. Significant foam contamination of the hooks would affect their ability to engage with the mating portion of the fastener. Such fastening devices are applied to one surface of a clamshell mold; a chemical mixture, usually of a diisocyanate and a polyol, are injected into a mold. The upper surface of the mold is closed and clamped shut while the chemicals react and blow to form a flexible foam, as known in the art.

SUMMARY

Several aspects of the invention features a mold in fastener product with a flexible substrate and a resin layer covering only part of one side of the flexible substrate and leaving a region of the one side of the flexible substrate exposed. The resin layer carries multiple touch fastener elements each having a resin stem extending integrally from the layer away from the flexible substrate to an engageable head. A flexible ferromagnetic strip is bonded to the flexible substrate and at least partially bounds a portion of the flexible substrate containing at least some of the touch fastener elements and at least a part of the exposed region.

In some embodiments, the ferromagnetic strip is disposed between lateral edges of the flexible substrate and the bounded portion. In some cases the ferromagnetic strip is disposed about a perimeter of the flexible substrate.

For mold-in applications, the ferromagnetic strip is positioned and configured to restrict intrusion of foam with the strip holding the fastener product against a mold surface.

In some examples, the part of the exposed region in the bounded portion extends across an entire extent of the bounded portion, such as from one side of the bounded portion to an opposite side.

In some embodiments, the flexible substrate includes or is a textile sheet, such as a non-woven textile material. In some cases, the resin layer is completely embedded within the textile sheet.

In some examples, the flexible substrate includes or is a resin film, such as of a resin of composition differing from that of the resin layer.

In some configurations, the resin layer includes or is in the form of multiple parallel lanes of resin, each resin lane carrying touch fastener elements, with each pair of adjacent lanes separated by a lane of exposed flexible substrate. In most cases, portions of each of the parallel lanes are within the bounded portion. Preferably, the ferromagnetic strip crosses at least one of the parallel lanes. In some examples, the flexible substrate is elastic in a direction transverse to the lanes of resin. Preferably, each lane of exposed flexible substrate is of a width, in a direction transverse to the lanes, less than 8 percent of an extent of the bounded portion in a direction transverse to the lanes.

In some configurations, the resin layer includes or is in the form of multiple discrete islands of resin, each resin island carrying touch fastener elements, with adjacent islands separated by exposed flexible substrate.

In some embodiments, the ferromagnetic strip is disposed on an opposite side of the flexible substrate as the touch fastener elements.

In some other embodiments, the ferromagnetic strip is disposed on the same side of the flexible substrate as the touch fastener elements. In some such embodiments, the strip defines a vent gap into the bounded portion between adjacent strip portions. In some cases, the gap is sized to allow some foam into the bounded portion without fouling all of the touch fastener elements within the bounded portion. In some examples, the gap defines a path with at least one bend of at least 30 degrees, such as a tortuous path.

In some embodiments with lanes of resin, the ferromagnetic strip abuts opposite longitudinal sides of at least one of the parallel lanes.

Preferably, a ratio of minimum to maximum lateral orthogonal dimensions of the bounded portion is between 0.3 and 1.0. In some examples, the minimum lateral dimension of the bounded portion is at least 50 mm. In some cases, the resin layer has an overall thickness of between 0.025 and 0.5 millimeters, as measured from the flexible substrate and/or the touch fastener elements extend to an overall height of between 0.13 and 1.6 mm from the resin layer.

In some embodiments, the fastener product is spooled into roll form, with multiple ferromagnetic strips bounding respective, spaced apart areas along a continuous flexible substrate.

In some cases, the resin layer has one or more stiffening ribs of resin extending away from the substrate in addition to the touch fastener elements. The one or more ribs are positioned to locally increase a bending stiffness of the fastener product. This can help to reduce waviness in the cushion surface, for example.

In some examples the fastener product defines spaced apart holes through the substrate, with the holes arranged to locally decrease a bending stiffness of the fastener product. In some cases a combination of strategically placed holes and stiffening ribs can contour the stiffness of the surface of a cushion, for both feel and function.

In some instances the fastener product also has a resin film disposed on a side of the substrate opposite the touch fastener elements. In some cases the film extends across holes defined through the substrate, such as to prevent foam intrusion when the product is used as an insert in a foam cushion mold.

For some applications, the fastener product has a layer of foam permanently attached to a side of the flexible substrate opposite the touch fastener elements. In some other applications, the flexible substrate has, or is itself, a layer of foam.

Another aspect of the invention features a mold in fastener product with a flexible substrate and a flexible ferromagnetic strip extending from the one side of the flexible substrate and at least partially bounding a bounded area of the flexible substrate. Multiple parallel lanes of resin are disposed within the bounded area and carried on the flexible substrate, each resin lane carrying touch fastener elements each having a resin stem extending integrally from the layer away from the flexible substrate to an engageable head, with each pair of adjacent lanes separated by a lane of exposed substrate surface. The ferromagnetic strip crosses the parallel lanes of resin of at least one pair of adjacent lanes and the lane of exposed substrate surface separating the at least one pair of adjacent lanes.

In some cases, the strip is configured to restrict intrusion of foam into the bounded area by holding the fastener product against a mold surface during foam molding.

The strip may be disposed about an outer perimeter of the fastener product, and/or between a lateral edge of the flexible substrate and the bounded area so as to restrict intrusion of foam into the area with the ferromagnetic strip held against a mold surface during foam molding.

In some cases, the lane of exposed substrate surface extends across an extent of the bounded area.

In some embodiments, the flexible substrate includes or is in the form of a textile sheet, such as a non-woven textile material. In some cases, the resin layer is completely embedded within the textile sheet.

In some embodiments, the flexible substrate includes or is in the form of a resin film of a resin of composition differing from that of the resin layer.

In some configurations, the flexible substrate is elastic in a direction transverse to the lanes of resin.

In some arrangements, the ferromagnetic strip is disposed on an opposite side of the flexible substrate as the touch fastener elements. In some other arrangements, the ferromagnetic strip is disposed on the same side of the flexible substrate as the touch fastener elements.

In some cases, the strip defines a vent gap into the bounded area between adjacent strip portions. The gap may be sized to allow some foam into the bounded area without fouling all of the touch fastener elements within the bounded area. In some configurations, the gap defines a path with at least one bend of at least 30 degrees.

Preferably, a ratio of minimum to maximum lateral orthogonal dimensions of the bounded area is between 0.3 and 1.0. In many examples, the minimum lateral dimension of the bounded area is at least 50 mm. The resin layer may have an overall thickness of between 0.025 and 0.5 millimeters, as measured from the flexible substrate, and/or the touch fastener elements may extend to an overall height of between 0.13 and 1.6 mm from the resin layer.

In some embodiments, the fastener product is spooled into roll form, with multiple ferromagnetic strips bounding respective, spaced apart areas along a continuous flexible substrate.

Another aspect of the invention features a method of forming a foam product having an embedded fastener product. The method includes positioning the above-described mold in product against an interior surface of a mold cavity; closing the cavity; introducing foaming resin to the cavity to cause the foaming resin to flow and expand to fill a volume within the cavity and engage a side of the product opposite the bounded portion or area; and curing the expanded foaming resin to form a molded foam product with the mold in product secured to cover a portion of a surface of the foam product.

In some applications, the interior surface of the mold cavity is a convex surface.

In general, the strip restricts intrusion of foam into the bounded area by holding the fastener product against the mold surface during foam molding.

In some examples, positioning the mold in product comprises positioning the ferromagnetic strip against the mold surface. In some applications, the strip defines a vent gap into the bounded area between adjacent strip portions, such that introducing the foaming resin causes some foam to flow through the vent gap into the bounded area without fouling all of the touch fastener elements within the bounded area.

In some cases in which the resin layer includes or is in the form of multiple parallel lanes of resin, and in which the foam product is a seat cushion, positioning the mold in product involves positioning the mold in product such that the lanes of resin extend in a direction selected to correspond to a vertical orientation in the seat cushion as installed for seating.

In some examples, the fastener product is sized to cover essentially an entire lateral extent of the foam product, such as a seating surface of a foam cushion.

Another aspect of the invention features a method of making mold in touch fastener products. The method includes molding a resin layer on a side of a textile sheet, leaving a region of the side of the textile sheet exposed; providing the resin layer with multiple touch fastener elements each having a resin stem extending integrally from the layer away from the textile sheet to an engageable head; and providing a flexible ferromagnetic strip bonded to the textile sheet and at least partially bounding portions of the textile sheet containing at least some of the touch fastener elements and at least a part of the exposed region.

In some cases, the method also includes separating the sheet into multiple discrete touch fastener products, each product having a respective bounded portion of the textile sheet.

In some embodiments, providing the resin layer with multiple touch fastener elements includes molding the resin stems while molding the resin layer.

Molding the resin layer may include molding the resin layer as a series of longitudinal lanes of resin spaced apart across the textile sheet.

In some applications, providing the ferromagnetic strip includes applying flowable ferromagnetic strip material to the one side of the textile sheet through a stencil, or spraying flowable ferromagnetic strip material on selected areas of the textile sheet. The sprayed ferromagnetic strip material may be pressed against the one side of the textile sheet. In some cases, the ferromagnetic strip material is sprayed across both a portion of the resin layer and a portion of exposed textile material, and then the sprayed ferromagnetic strip material is pressed against the portion of the resin layer.

In some embodiments, the ferromagnetic strip is provided after molding the resin layer. In some cases, molded stems from selected regions of the resin layer before providing the ferromagnetic strip, and providing the ferromagnetic strip includes positioning strip material at the selected regions. In some examples, providing the ferromagnetic strip involves forming the ferromagnetic strip from flowable strip material across both the resin layer and exposed textile sheet.

In some applications, the sheet is separated into discrete touch fastener products by die cutting through the sheet.

In some embodiments, the flexible substrate is or includes a textile sheet. In some examples, the ferromagnetic strip material encapsulates fibers of the textile sheet. In some cases, the flexible substrate is or includes a resin film.

Another aspect of the invention features method of forming a seat cushion. The method includes positioning the above-described product, in any of its described forms, against an interior surface of a mold cavity, then closing the cavity and introducing foaming resin to the cavity to cause the foaming resin to flow and expand to fill a volume within the cavity and engage a side of the product opposite the bounded area. The expanded foaming resin is cured to form a molded foam topper pad with the mold in product secured to cover a portion of a surface of the topper pad. The topper pad is then permanently secured to a molded seat cushion base to form a seat cushion having the bounded areas exposed for releasable engagement of a seat cover to the seat cushion.

In some examples, the topper pad forms substantially all of a seating surface of the seat cushion. For example, the topper pad may form both a central seating area and bolsters on either side of the central seating area.

In some cases the foaming resin introduced to the cavity is selected to mold the topper pad to be softer than the molded seat cushion base.

Various aspects of the invention can provide molded products, such as vehicle seat cushions, with fastening functions spread across wide areas, such as for holding on a seat cover. Such wide area fastening, particularly in concave areas of the cushion surface, can help prevent 'bridging' of the cover, where the cover fails to follow the concave curvature of the seat cushion. Such wide area fastening can also help to lower the shear loads applied to local fastening members, by distributing the fastening over a wider area and multiple engagements, avoiding local distortions of the seat cover. Fastener products fashioned according to various aspects of the invention may also enable more complex seat contours, by holding the seat cover securely across more complicated cushion topographies without having to individually place a large number of smaller, discrete fastener products.

The details of one or more embodiments of the invention are set forth in the accompa-nying drawings and the description below. Other features, objects, and advantages of the invention will be apparent from the description and drawings, and from the claims.

DESCRIPTION OF DRAWINGS

FIG. 12 is an enlarged view of a portion of the product of FIG. 8.

Like reference symbols in the various drawings indicate like elements.

DETAILED DESCRIPTION

Figure 1A:
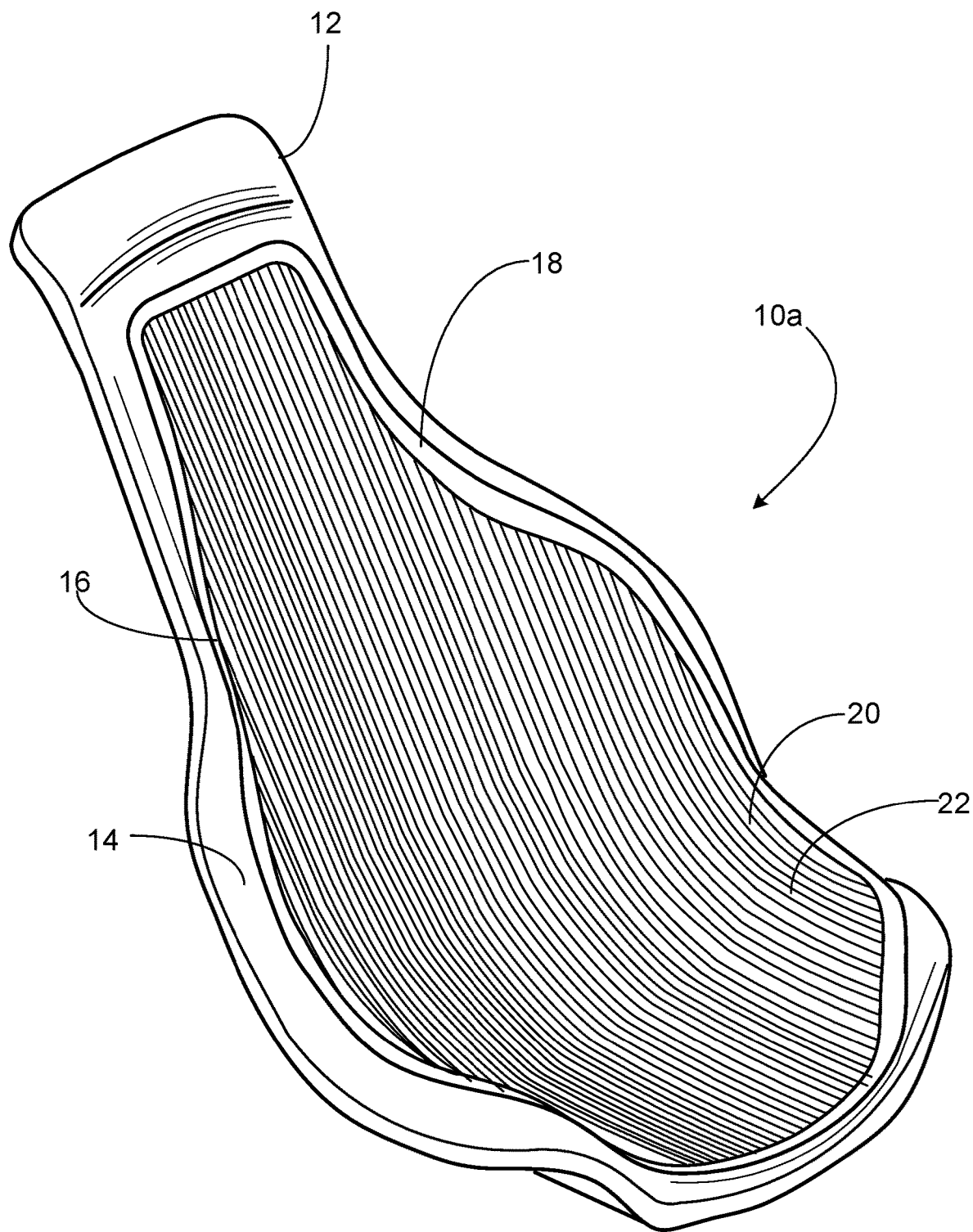
FIGS. 1A and 1B show foamed seat cushions with different arrangements of wide-coverage fastening areas.

Referring first to FIG. 1A, a foam seat cushion 10*a* for a passenger seat of a vehicle has a contoured foam core 12 and an exposed upper surface 14 featuring a fastening area 16 in which discrete touch fastener elements (e.g. hooks, far too small to be seen in this view) are exposed for releasable engagement with the underside of a seat cover, to hold the cover in place from shifting around during use under loads from moving passengers and to form the intended shape and contour of the final sheet. As illustrated in this example, fastening area 16 covers the vast majority of the generally concave upper surface 14 of the foam core, and is bounded about its perimeter by a border 18. A substrate in the form of a textile sheet 20 is secured across the fastening area, bonded to the surface of the foam core. Textile sheet 20 may be, for example, a non-woven, woven or knitted fibrous material. Examples of non-woven textile substrates include spunbond non-wovens, such as Foamguard LX 47754, and LX Grey FR 15025, both available from Hanes Companies (https://hanescompanies.com/), a Leggett&Platt company, and SMS non-wovens such as of polypropylene in the weight range of 30 to 200 gsm (preferably 100 to 150 gsm) and available from Sommers Nonwoven Solutions of Mooresville, N.C., USA. Carried by the textile sheet is a resin layer 22 covering only a portion of the textile sheet leaving another portion of the textile sheet exposed. In this example, the resin layer is in the form of several parallel lanes of resin separated by lanes of exposed textile sheet. The lanes of resin each carry several of the touch fastener elements, each having a resin stem extending integrally from the layer away from the textile sheet to an engageable head, as will be discussed below. The lanes of resin follow the contours of the seat cushion, to hold the seat cover tightly against the contoured surface and to prevent the cover from being separated and bridging across concave portions of the surface. Along the seat back, the lanes are oriented to extend vertically with the seat cushion positioned for seating.

Figure 1B:
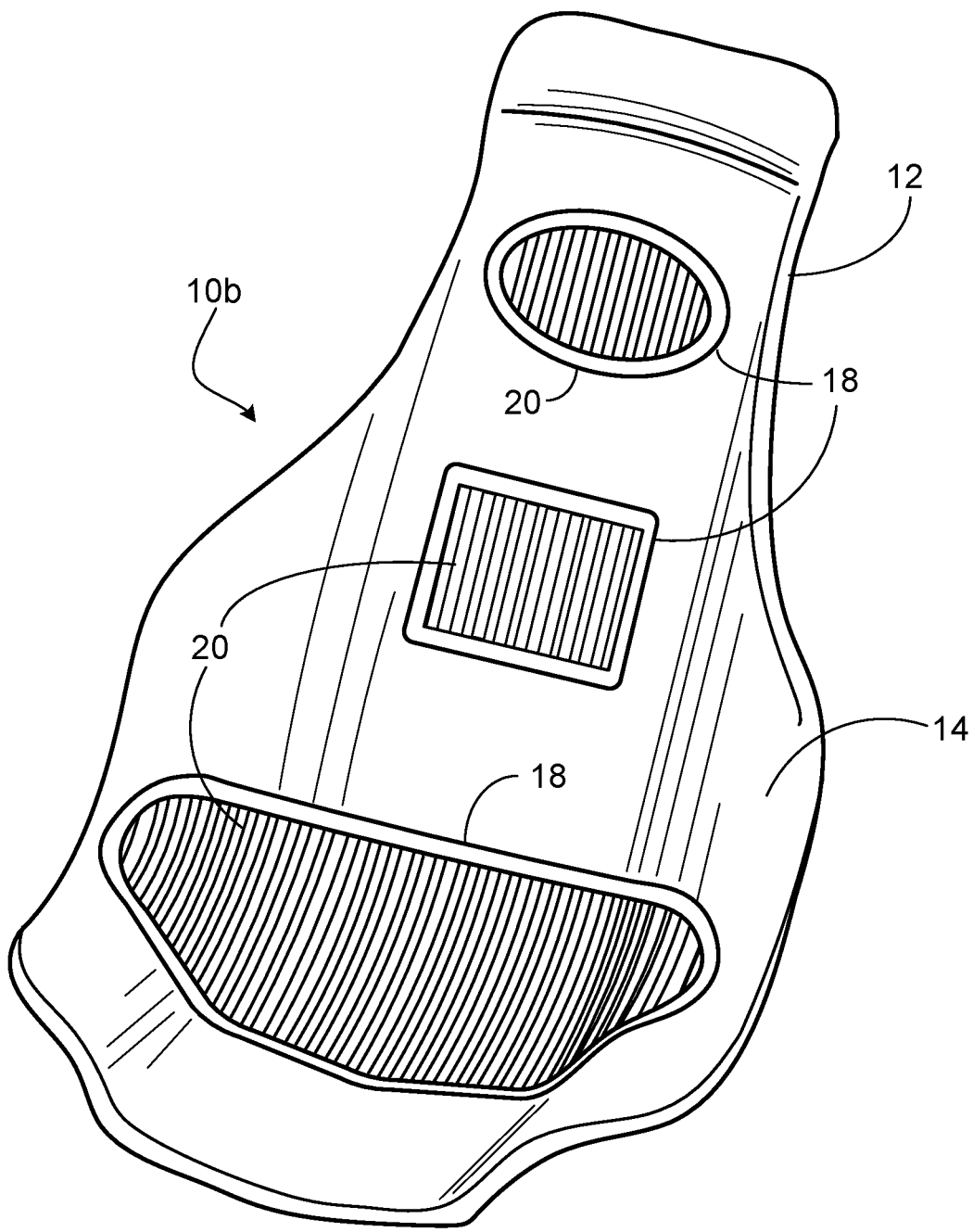

FIG. 1B shows a foam seat cushion 10b with multiple fastening areas 16, each bounded by a respective border and separated from the other fastening areas by exposed regions of foam. In this example the areas include an oval area with a curved border in the neck region of the seat cushion, a rectangular area in the back region, and a wide area extending across the cushion, including the side bolsters, in the lower region of the seat cushion. This layout of fastening areas is merely to demonstrate a few of the types of fastening areas that may be provided, and many other fastening area arrangements are envisioned, including arrangements in which broad fastening areas are separated by narrow strips of exposed foam, and narrow elongated fastening areas following creases in the seat cushion. Each of the fastening areas shown in these figures covers a wide area, in that a ratio of minimum to maximum lateral orthogonal dimensions of the fastening area is greater than 0.3, or between 0.3 and 1.0. Also, for each fastening area the minimum lateral dimension is at least 50 mm.

Figure 2:
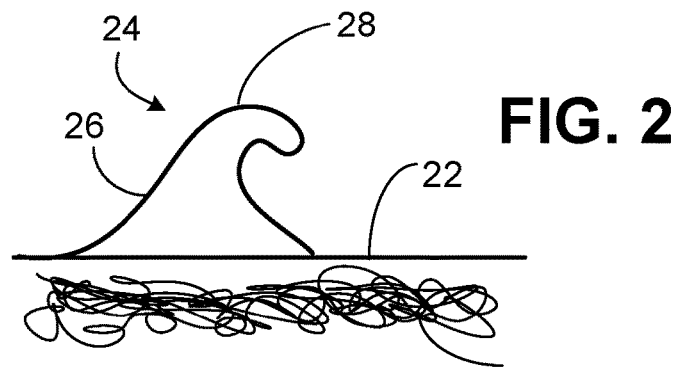
FIG. 2 is a side view of a portion of a fastener product, showing a fastener hook on one side and a non-woven textile surface on the other side.

Referring next to FIG. 2, the resin layer 22 is laminated to the textile sheet 20, such as by being molded onto the surface of the sheet such that resin of the layer encapsulates surface fibers of the sheet to form a permanent bond. By permanent we mean that the bond between the textile sheet and the resin layer is at least significantly stronger than the peeling force the fastener elements can withstand. In another example, the resin layer is adhesively bonded to the substrate. The touch fastener elements 24 carried by the layer each have a resin stem 26 extending integrally from the layer away from the textile sheet to an engageable head 28. While only one touch fastener element is illustrated, it will be understood that layer 22 will typically carry several hundred such elements, each extending from the layer surface and arranged in rows and columns. The elements may be in the form of J-hooks as shown, or palm tree or mushroom-type fastener elements, or any other shape of touch fastener elements useful for engaging fibers. In one application the fastener elements are quadralobal mushroom-elements produced under the trade name SUPERVELOCK by Velcro Europe S.A. or VELCRO Brand P87S by Velcro USA Inc. Low-profile mushroom-type fastener elements are also useful. The resin layer itself is quite thin (e.g., extending only between about 0.025 and 0.5 mm from the textile sheet surface) and flexible. In some cases the resin layer is completely embedded within the textile sheet surface such that it has no appreciable thickness outside the sheet. The touch fastener elements are generally small, extending to an overall height of only between about 0.13 and 1.6 mm from the exposed surface of the resin layer. Suitable touch fastener elements include HK409 (0.13 mm high, 0.1 mm thick), HK99 (1.6 mm high, 0.3 mm thick), HK22 (0.7 mm high, 0.2 mm thick) and HK108 (0.4 mm high, 0.15 mm thick). The spacing between adjacent rows of fastener elements within a row may be 0.1 to 0.2 mm, for example.

HK108 is described in U.S. Pat. No. 9,958,070 to Cornu et al. the entire contents of which is hereby incorporated by reference.

Figure 3:
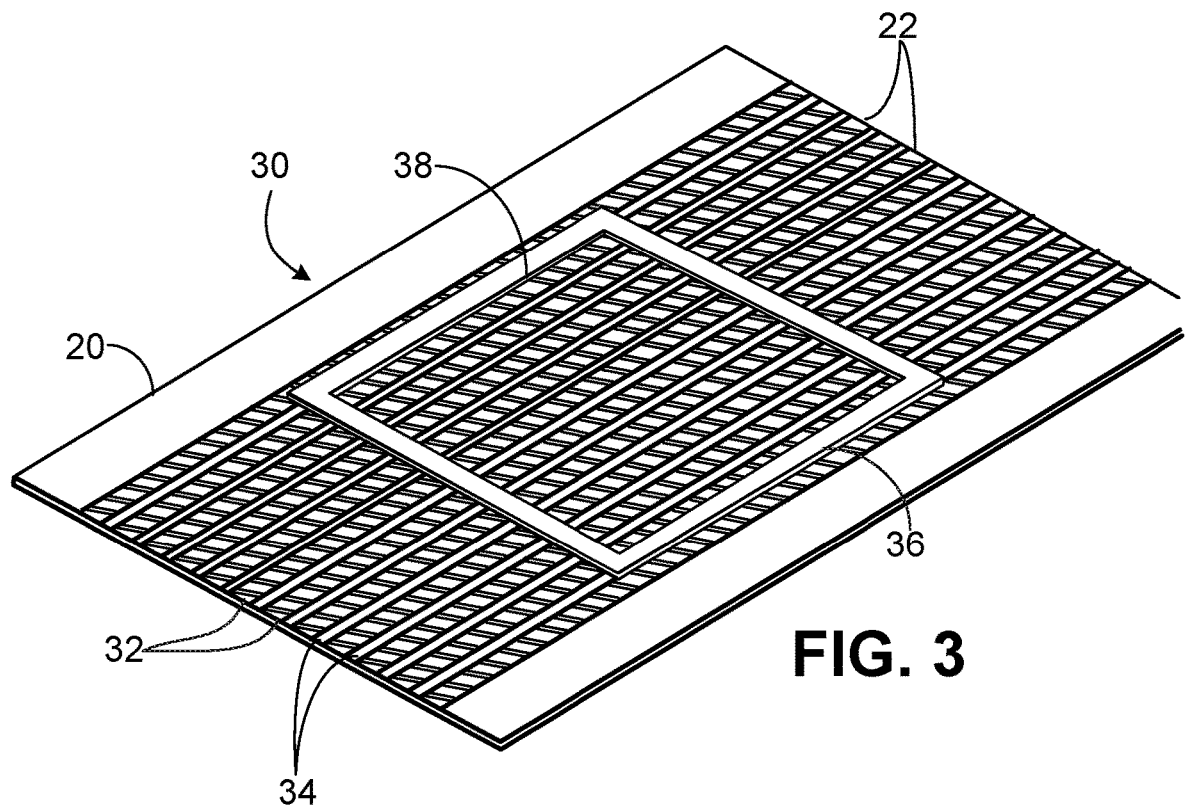
FIG. 3 is a perspective view of a first fastener product with a ferromagnetic strip bounding a fastening area.

FIG. 3 illustrates a representative fastener product 30, or fastener product preform from which a fastener product is cut, for use in a seat cushion. For illustration purposes it is shown as a rectangular piece of textile sheet 20, but it may be of any shape. Resin layer 22 is in the form of several discrete lanes 32 of resin extending parallel along the sheet, with narrow lanes 34 of exposed sheet between them. The separation of layer 22 into discrete lanes enhances the flexibility of the product, enabling it to be readily draped to follow a desired contour. Each resin lane 32 may be, for example, between 1.5 and 15 mm wide, with exposed textile lanes 34 of 1.5 to 15 mm width. In one example, each resin lane 32 is 8.0 mm wide and each adjacent pair of lanes is separated by a lane 34 of 2.0 mm width. In this example, each resin lane 32 carries 14 rows of touch fastener elements extending along the length of the lane, each row including 9 touch fastener elements per cm of length.

A flexible ferromagnetic strip 36 extends from the side of the textile sheet on which the resin lanes 32 are carried and bounds a fastening area or bounded portion 38 of the textile sheet containing some of the touch fastener elements. The ferromagnetic strip is disposed between lateral edges of the textile sheet and the bounded portion. When foamed into a seat cushion, strip 36 will form the border (18, FIGS. 1A and 1B) of a fastening area of the seat cushion. Strip 36 is exposed on the product and crosses several resin lanes 32 and textile lanes 34. In this example it is illustrated as bounding a square portion of the product. On one side of the product, lengths of the lanes are exposed and span the bounded portion. On the other side of the product (not shown), the textile sheet spans the bounded portion without any exposed resin of the resin lanes. The textile lanes 34 spanning the extent of the bounded portion on one side, overlaying exposed textile surface on the other side, give the bounded portion 38 an advantageous degree of flexibility and ability to conform to surfaces. The ferromagnetic strip itself is also extremely flexible, allowing the entire product to flex to conform to a mold surface during seat foaming and to permit resilient seat distortion without separation in use. In fastener products for covering wide areas, a ratio of minimum to maximum lateral orthogonal dimensions of the bounded portion is greater than 0.3.

Figure 3A:
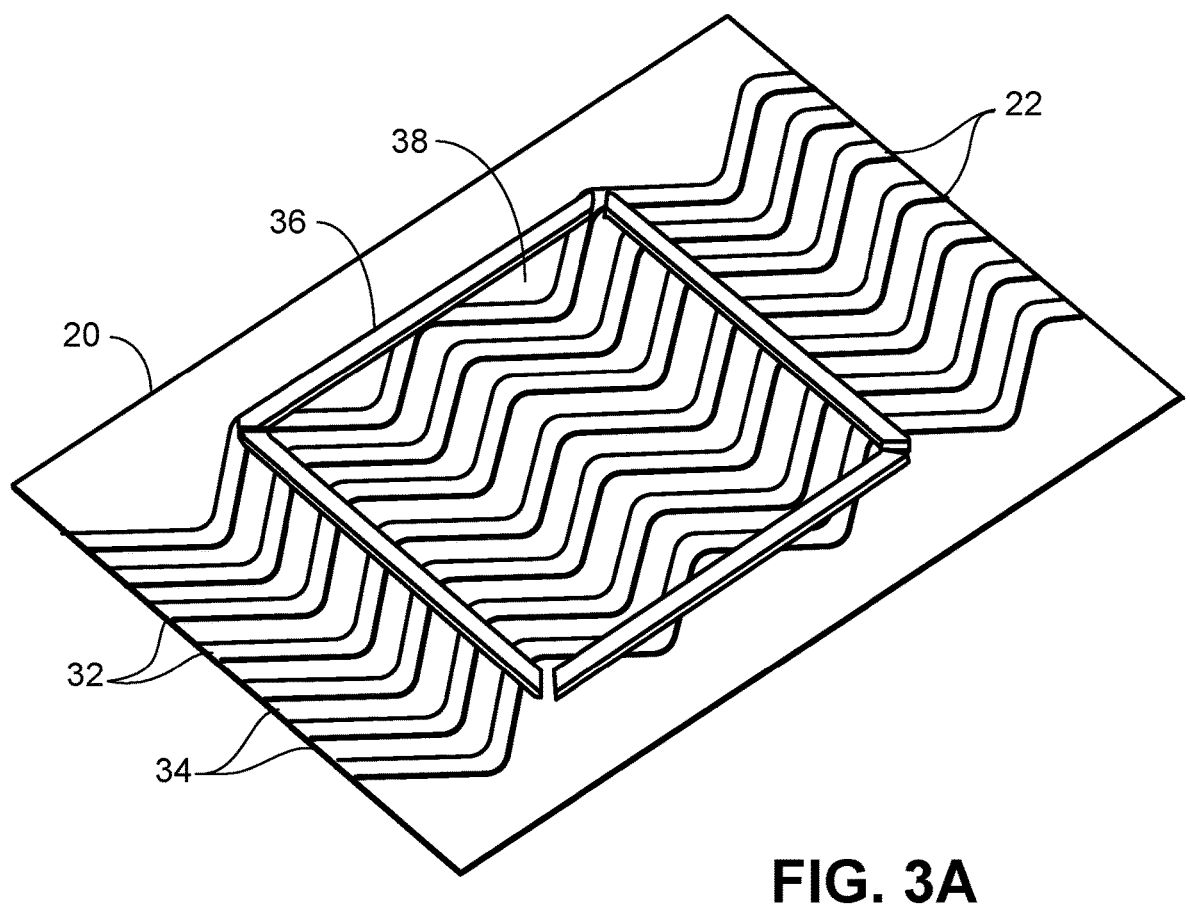
FIG. 3A is a perspective view of a fastener product like the one of FIG. 3 but with sinusoidal lanes and vent gaps at the corners of the ferromagnetic strip.

In some other examples the lanes of fastening elements are not straight, parallel and of consistent width, as in FIG. 3. For example, the product 30a of FIG. 3A is identical to the one of FIG. 3, except that the spaced apart lanes of resin making up the resin layer are sinusoidal, rather than linear. The lanes of this example are still of the same width, and still evenly spaced from each other, and of similar width to those discussed above. The lanes may follow other curved paths than sinusoidal, or triangular (saw-tooth) paths. Departing from a purely linear path can give the product increased flexibility for curvature in all directions, and can help to avoid discerning the edges and direction of the lanes through the seat cover material. The lanes may be formed in other arrangements, suitable for optimum fastening performance in each application. For example, the widths of the lanes may vary along their length, or the widths of different lanes may be unequal across the width of the product.

Figure 4:
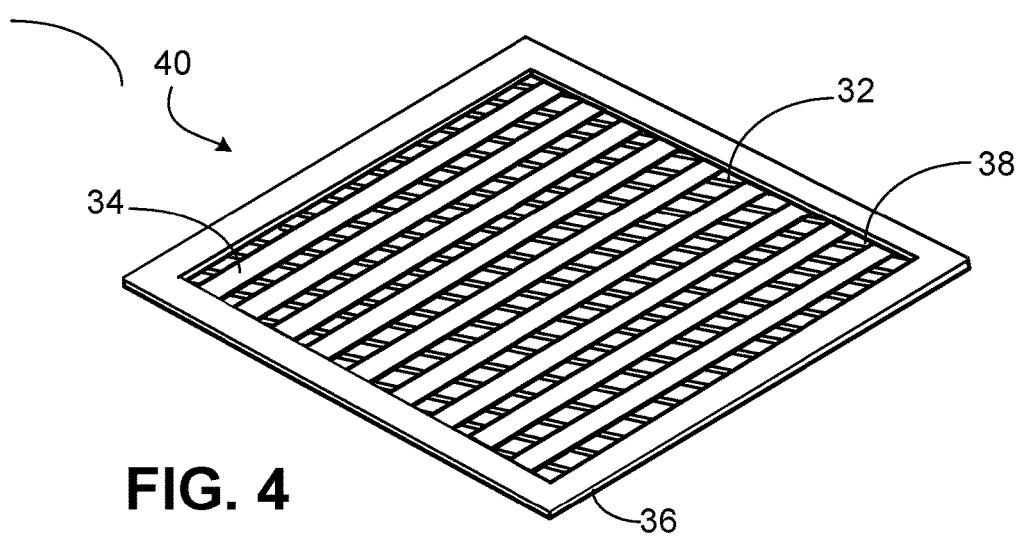
FIG. 4 is a perspective view of a second fastener product, trimmed from the product of FIG. 3.

Referring next to FIG. 4, fastener product 40 is a useful fastener product that has been cut from fastener product 30 of FIG. 3, such as by die-cutting about the outer perimeter of ferromagnetic strip 36, leaving only the ferromagnetic strip and the bounded portion 38, with the ferromagnetic strip disposed about a perimeter of the remaining textile sheet. To cut product 40 out of the larger product, the sheet may be severed at the outer edge of ferromagnetic strip 36, or leaving a short selvedge of a few millimeters extending beyond the ferromagnetic strip. For many applications excess selvedge can cause voiding during foaming. Keeping the fastener elements non-functional at the perimeter of the product, such as by fouling or encapsulating them with the ferromagnetic strip material (or by removing them from a selvedge beyond the ferromagnetic strip), helps to prevent generating peel loads at the ends of the lanes in use.

Each of the parallel resin lanes and textile lanes extend across the entire bounded portion. The textile lanes 34 extending across the entire bounded portion in one direction significantly enhances the flexibility of the product for bending in the opposite direction during draping, as such bending does not require significant bending of the resin layer. The orientation of lanes can be selected to provide the most flexibility in the direction of intended bending during installation in the foaming mold. In some cases, the fabric sheet is elastic in the direction transverse to the lanes, to provide even greater ability to follow the contours of the mold surface. Each lane 34 of exposed textile sheet is preferably of a width, in a direction transverse to the lanes, less than eight percent of an extent of the bounded portion in a direction transverse to the lanes. For many applications, the total percentage of the bounded area corresponding to the resin (fastening) lanes is between 40 and 80 percent, preferably 60 percent, (of the total bounded area).

Figure 5:
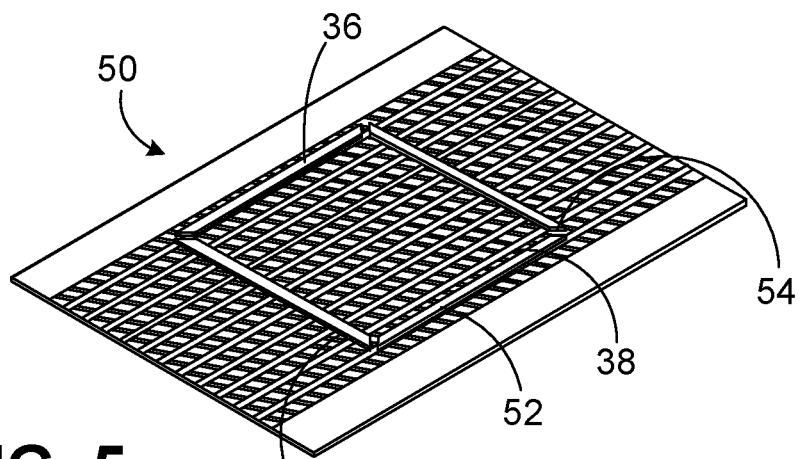
FIG. 5 is a perspective view of a third fastener product, showing a first arrangement of ferromagnetic strip segments defining gaps.

Referring to FIG. 5, a fastener product 50 is identical to that shown in FIG. 3, with the exception that the ferromagnetic strip 36 is in the form of four discrete segments 52 that together bound the bounded portion or fastening area 38. The segments are spaced from one another at their ends to define narrow gaps 54 that function as vents during foaming and that form narrow passages along which foam flows as it hardens. The width and length of gaps 54 are selected such that only a small amount of foam enters bounded portion 38 and fouls only a relatively small number of fastening elements near the corners, leaving sufficient fastening elements exposed to perform the fastening function. In some applications, the gaps are sized to allow some foam into the bounded portion without fouling all of the touch fastener elements within the portion. The dimensions necessary to permit a desired amount of foam flow will be a function of the foaming resin viscosity and pressure but will be readily determinable by those working in this field with a minimal number of trials.

Figure 6:
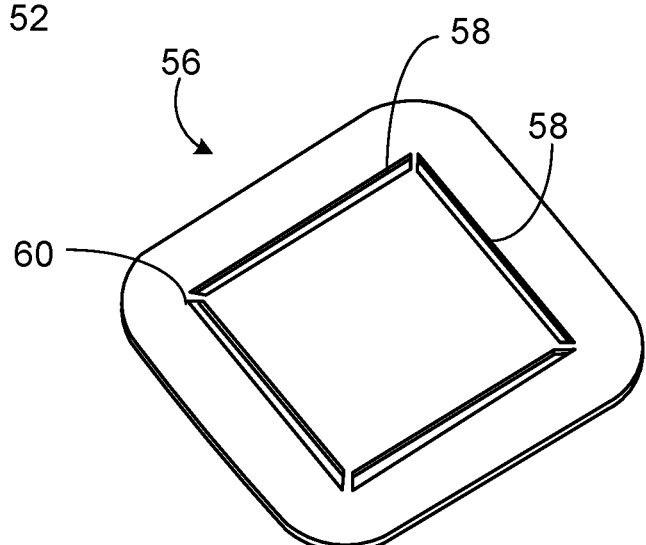
FIG. 6 shows a template useful for applying ferromagnetic strip material to create the arrangement of FIG. 5.
Figure 7:
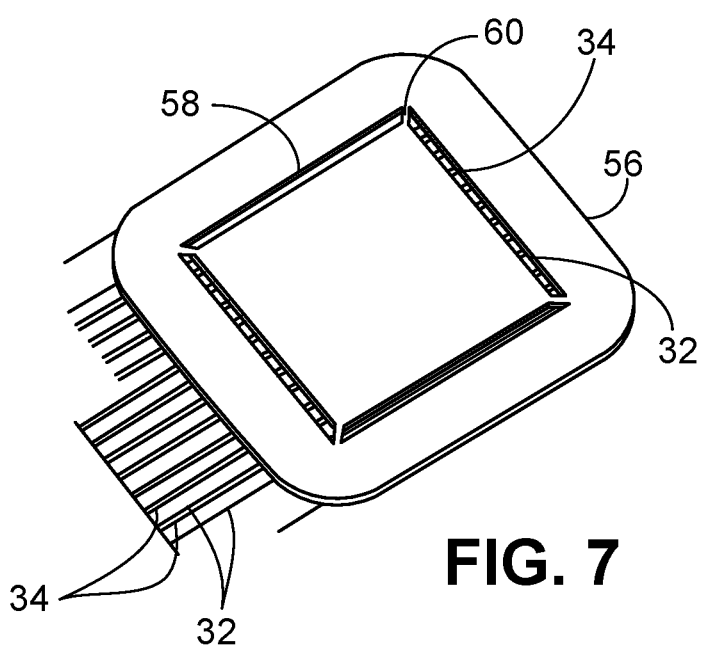
FIG. 7 illustrates the template of FIG. 6 overlaying a sheet of fastener material for application of ferromagnetic strip material.

Referring also to FIGS. 6 and 7, configuring the ferromagnetic strip to define narrow gaps 54 enables application of the flowable ferromagnetic strip material to the fastener sheet through a template 56 that defines elongated apertures 58 shaped to form the ferromagnetic strip segments. Narrow bridges 60 of template material separate the apertures and form the gaps 54 between segments. Template 56 may be of a rigid or semi-rigid material, such as metal shim stock, and preferably has a thickness corresponding to the height of the resulting ferromagnetic strip segments above the tops of the fastening elements.

Figure 8:
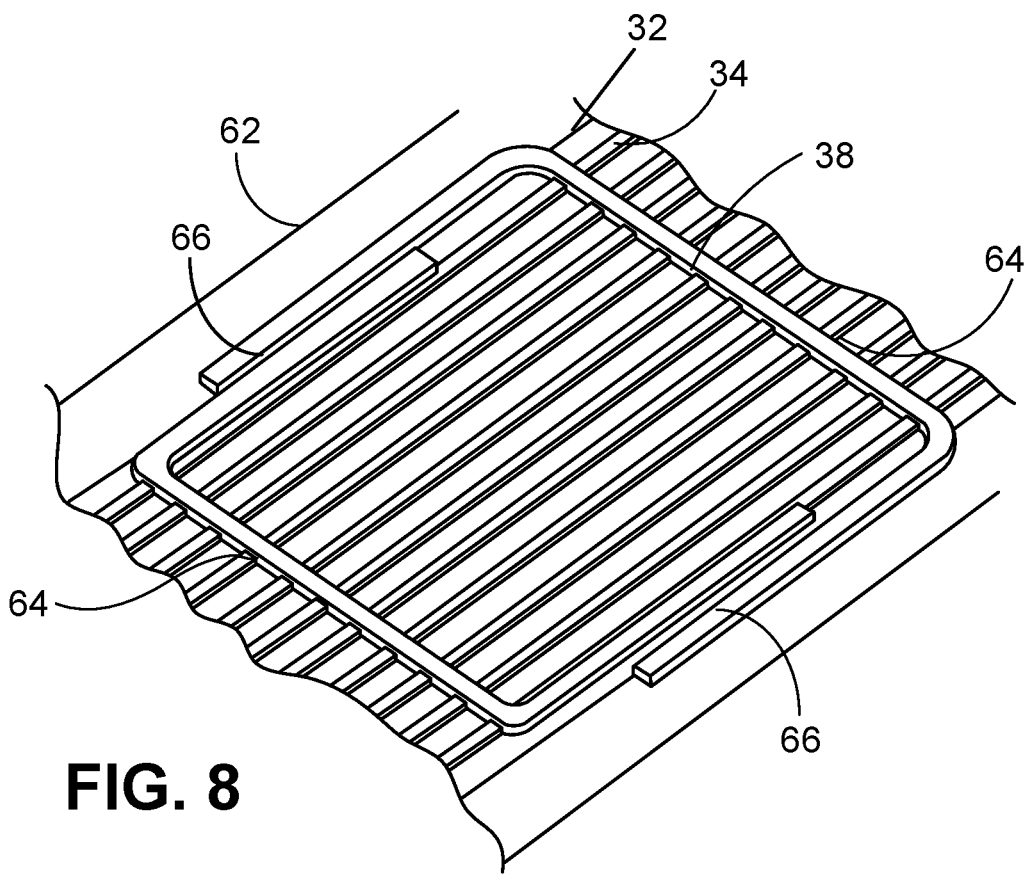
FIG. 8 is a perspective view of a fourth fastener product, showing a second arrangement of ferromagnetic strip segments defining gaps.
Figure 9:
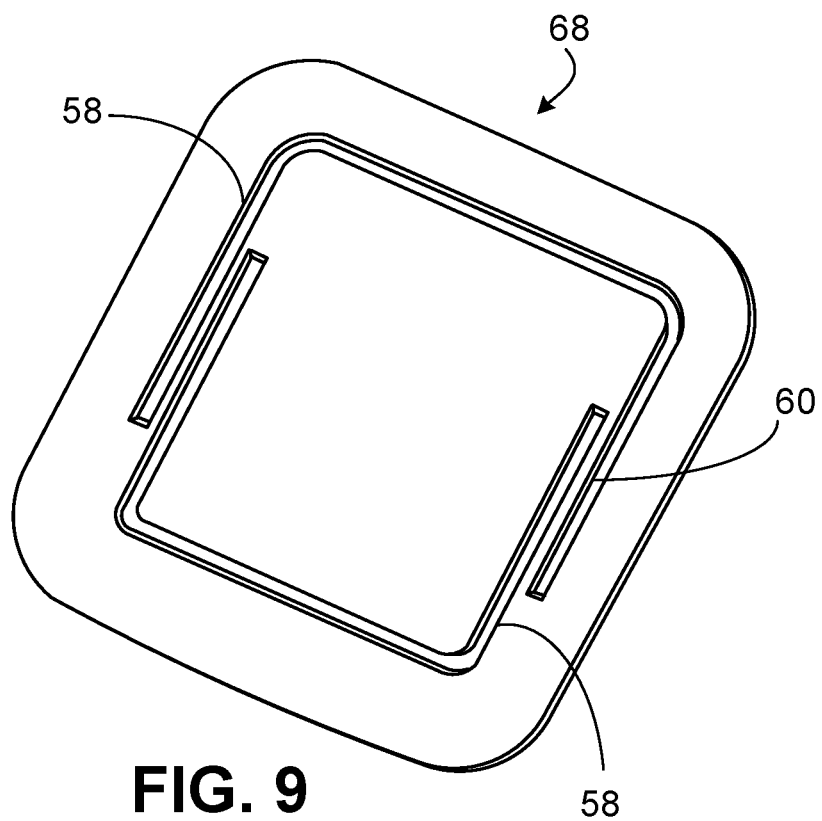
FIG. 9 shows a template useful for applying ferromagnetic strip material to create the arrangement of FIG. 8.

Other ferromagnetic strip segment shapes and arrangements are envisioned. Referring next to FIG. 8, fastener product 62 has a ferromagnetic strip in the form of nested cup-shaped segments 64 that have overlapping arms defining gaps 66 therebetween. This arrangement provides long gaps defining a long flow length along which foam must flow to reach the bounded portion 38, resulting in lower flow penetration into the fastening area. The ability of a straight (non-tortuous) path to effectively impede foam intrusion into the bounded area will be a function of the overall flow length along the path, the minimum lateral dimension of the gap perpendicular to flow, the viscosity of the foaming resin, the pressure at which it is forced against the gap opening, and how quickly the resin is cured against the mold surface. FIG. 9 shows a corresponding template 68 for forming the nested cup-shaped ferromagnetic strip segments.

Figure 11:
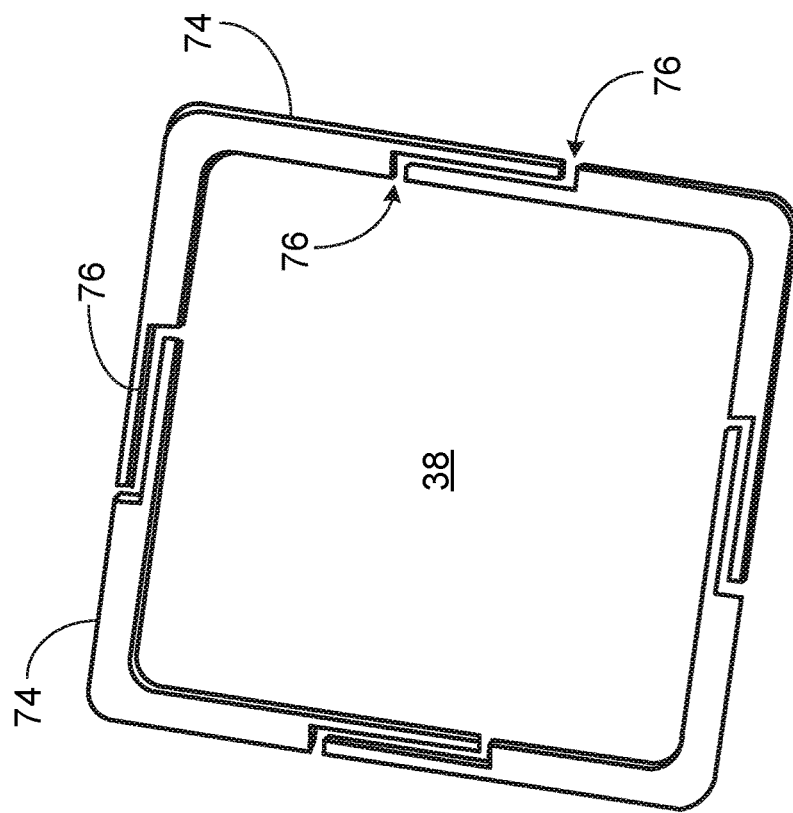
FIGS. 10 and 11 show third and fourth arrangements of ferromagnetic strip segments defining gaps.
Figure 10:
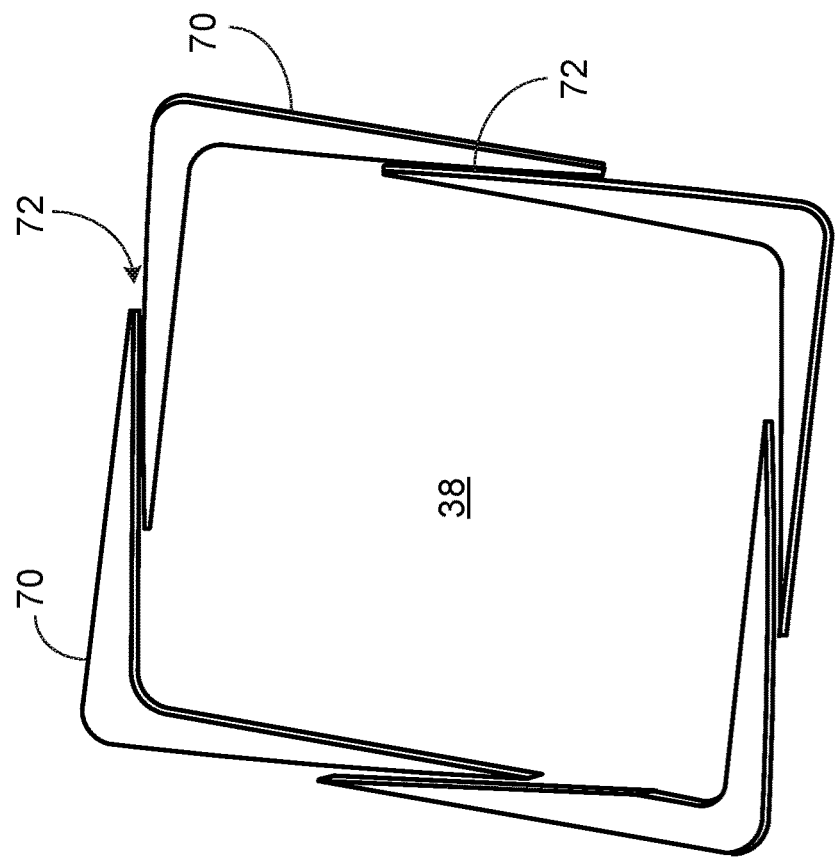

FIGS. 10 and 11 show other arrangements of ferromagnetic strip segments bounding fastening area or bounded portion 38. In the arrangement of FIG. 10, each of four segments 70 bounds one corner of the square fastening area, and is spaced from two other segments along gaps 72 that extend at angles with respect to the sides of the fastening area so as to define a greater flow length than if they were to extend straight across the ferromagnetic strip. In the example of FIG. 11, each of four segments 74 bounds one corner of the square fastening area, and is spaced from two other segments along gaps 76 that define crooked flow passages that force a flow of foam along the passage to change direction abruptly, slowing down the foam flow and resulting in less overall foam intrusion. This is an example of a tortuous path flow channel. Preferably such a path would include at least one bend of at least 30 degrees. All of the above gap arrangements can function as gas vents to help avoid voiding. Furthermore, foam solidification along the paths can enhance the anchoring of the fastener product to the foam at the edges of the fastening area.

Figure 13:
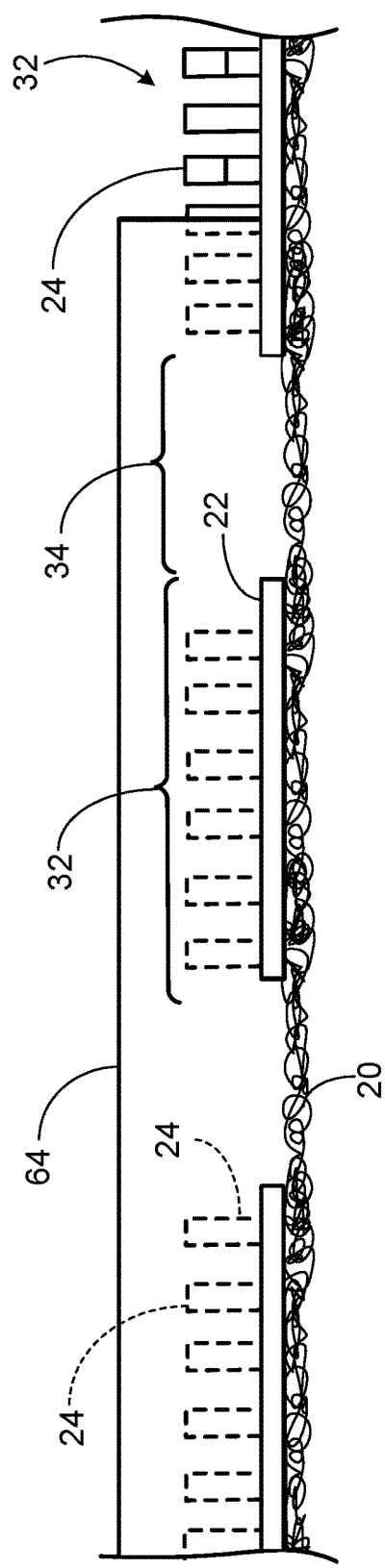
FIG. 13 is an enlarged side view of the product portion shown in FIG. 12.

Referring to FIGS. 12 and 13, the ferromagnetic strip segments of any of the above examples cross several resin lanes 32 and textile lanes 34. Crossing the resin lanes 32 the ferromagnetic strip material encapsulates the individual fastening elements (omitted from FIG. 12). Crossing the textile lanes 34 the ferromagnetic strip material encapsulates surface fibers of the textile sheet and abuts opposite longitudinal sides of the adjacent resin lanes. In this manner the ferromagnetic strip segments 64, like other ferromagnetic strip segments of other embodiments, effectively block foam from flowing along or between the lanes and into the fastening area. Any minor encroachment across a segment should not foul a significant number of fastener elements. In FIG. 13 the ferromagnetic strip segment 64 is shown crossing two textile lanes 34 and resin lanes 32, and encapsulating only a portion of the resin lane 32 at the right side of the figure. As shown, the ferromagnetic strip segment fully encapsulates and extends over the fastener elements 24 of the crossed resin lanes. For example, the overall strip height may be between 0.5 and 3.0 times the overall height of the fastener elements, both measured perpendicular from resin lane bases 22. In examples where the strip extends to a height greater than the fastener elements 24, the resulting gap between the upper strip surface and the mold surface during foaming should be sufficiently small to impede foam flowing through the resulting gap and flooding the fastener elements in the bounded area.

Figure 14:
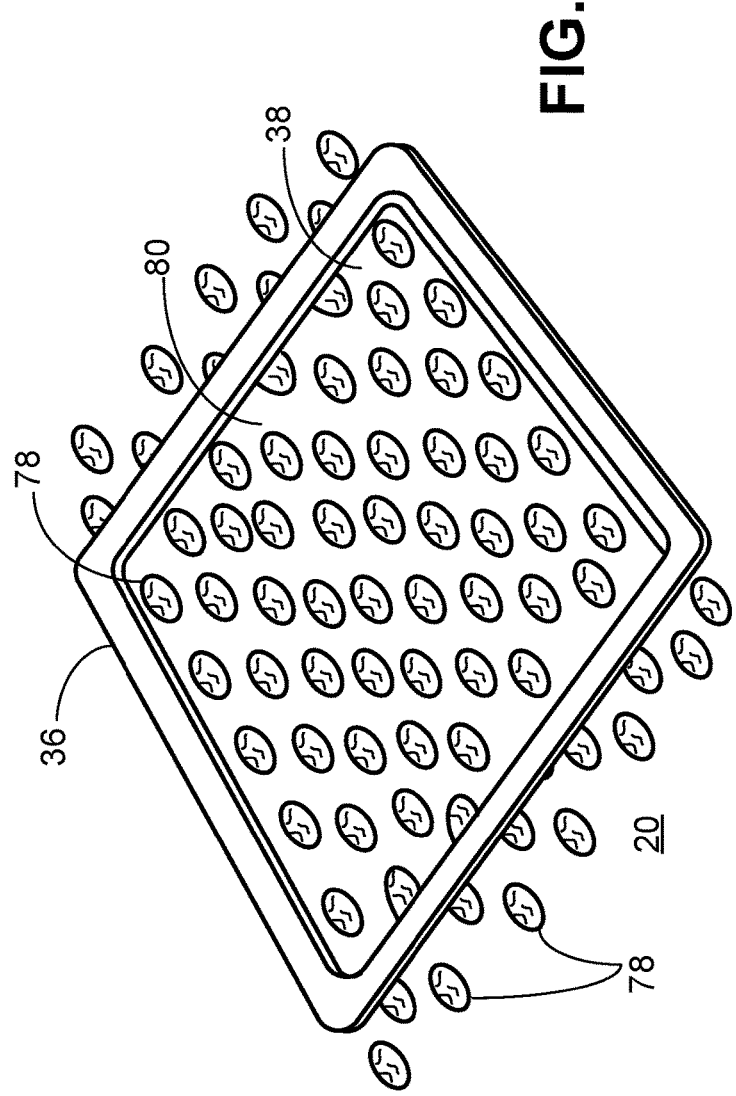
FIG. 14 is a perspective view of a fifth fastener product, having an array of fastening islands within a bounded area.

In the above-described examples, the resin layer carrying the fastener elements is in the form of spaced-apart resin lanes 32, extending parallel across the extent of the bounded portion or fastening area 38. However, other arrangements of the resin layer are envisioned that leave exposed textile sheet within the bounded area. For example, in FIG. 14 the textile sheet 20 carries discrete islands 78 of resin, spaced from each other by a contiguous area of exposed textile sheet surface. Each island carries multiple fastener elements molded integrally with resin of the island surface. Ferromagnetic strip 36 bounds a bounded portion 38 containing several discrete islands, with portions of the ferromagnetic strip overlapping islands and exposed textile sheet surface to form an effective barrier to prevent foam from flooding the islands within the bounded area during seat cushion formation. The contiguous area 80 of exposed textile sheet extends across the extent of the bounded area in both directions, such that the fastener product has a particularly low bending resistance in all directions within the fastening area. In some arrangements (not illustrated) the resin layer may be in the form of a mix of islands and lanes.

Figure 15:
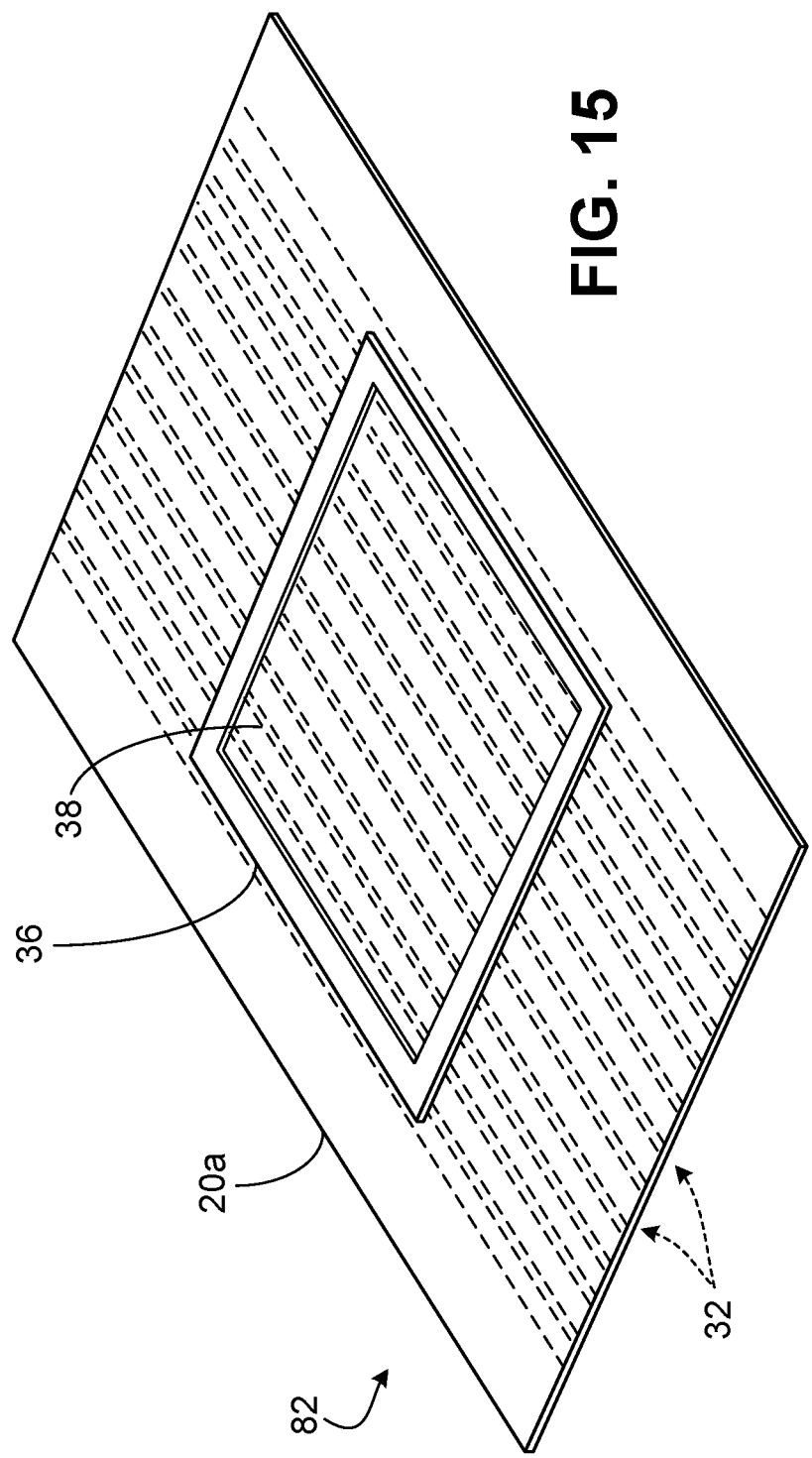
FIG. 15 is a perspective view of a sixth fastener product, having a ferromagnetic strip on an opposite side of the product than the fastener elements.

In the above-described examples, the ferromagnetic strip is disposed on the same side of the flexible substrate as the resin layer carrying the fastener elements, and the flexible substrate has been described as a textile sheet. However, in other examples substrate may be in the form of a resin film, and/or the ferromagnetic strip may be disposed on an opposite side of the product while still bounding the fastening area. For example, in fastener product 82 of FIG. 15 the ferromagnetic strip 36 is carried on the back side of a resin film 20a that forms the flexible substrate, that is, on the side opposite the resin lanes 32 carrying the fastener elements. Even though on the obverse side of the fastener product, the ferromagnetic strip 36 still functions to inhibit foam intrusion into the fastening area on the side opposite the ferromagnetic strip, as will be discussed in more detail below. The resin film may be impermeable to air, or may have microscopic perforations for venting. Preferably, the resin film is elastically stretchable in its plane in a direction transverse to the resin lanes. Like the textile examples above, the film is continuous and underlies the resin lanes. The film may be of a resin selected for optimum adhesion to the foam that will be molded against it. It will be understood that the ferromagnetic strip and resin lanes may be carried on the same side of resin film 20a, and that the ferromagnetic strip and resin lanes may be carried on opposite sides of a textile sheet. In some cases, the substrate may include both a textile fabric and a film, such as a textile fabric with a film forming a back coating or binder layer.

Figure 16:
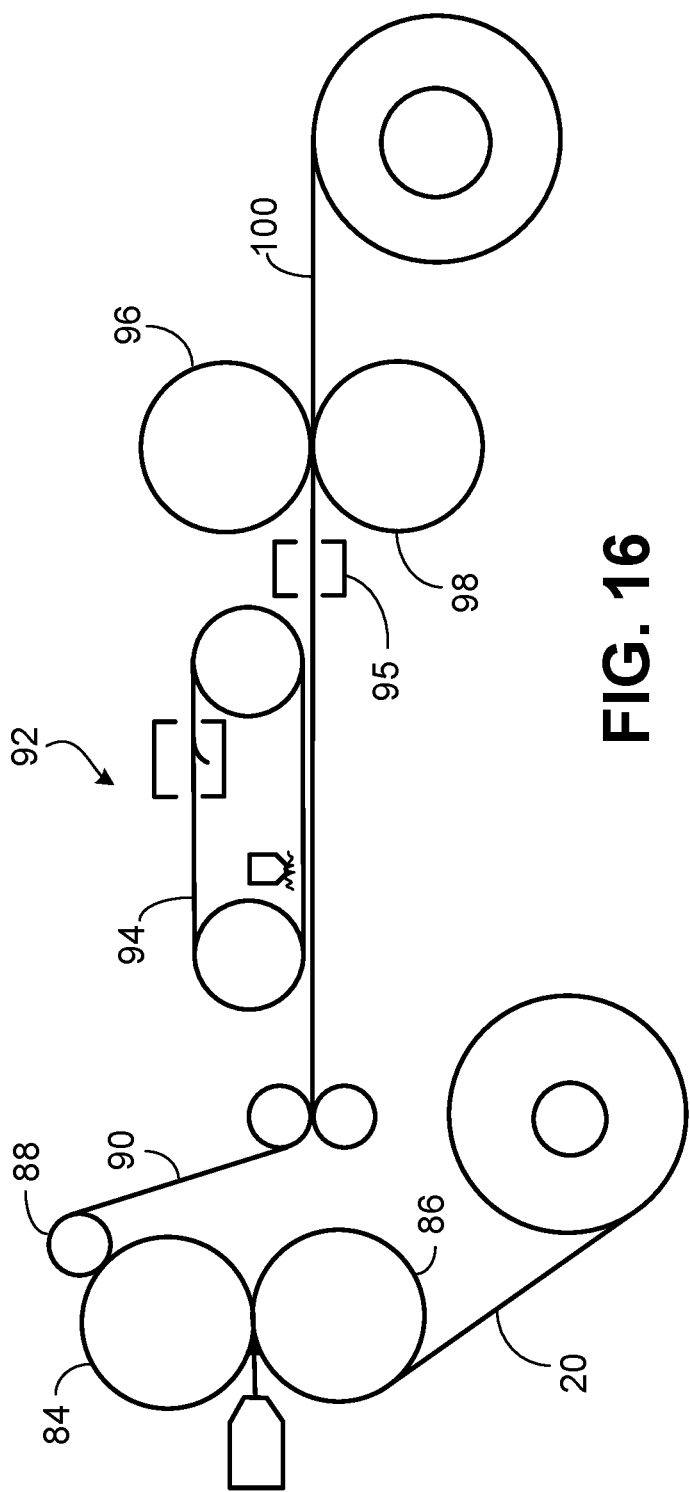
FIG. 16 illustrates a process and apparatus for making fastener products.

Referring next to FIG. 16, the above examples of fastener product may be produced in a method and with an apparatus that features first molding the resin layer, with its fastener elements, directly on a textile sheet surface, such as was taught in Kennedy et al, U.S. Pat. No. 6,248,419, in discrete islands or spaced apart lanes as taught in Krantz et al, U.S. Pat. No. 7,048,818, the contents of both of which as to forming methods and lane/island distribution and substrate materials are hereby incorporated by reference. This forming method involves introducing a flowable resin into a nip between rotating mold roll 84 and pressure roll 86 along with preformed textile sheet material 20. In the molding nip the resin encapsulates surface fibers of the sheet and also fills individual blind cavities in the mold roll to form at least the stems of the fastener elements. The resin may be introduced as continuous lanes of resin, such as from a deckled die as shown, to form resin fastening lanes on the sheet, or may be introduced as discrete deposits of resin, such as by printing such deposits onto the surface of the mold roll or textile sheet immediately upstream of the molding nip. Once the textile sheet and resin have been carried on the cooled mold roll a sufficient time to solidify the resin, the sheet is stripped from the roll by passing about stripper roll 88. If only fastener element stems were molded on roll 84, at this point heads may be formed on the stems, such as to form mushroom-type fastener elements, as known in the art. At this point the product 90 is a dimensionally stable sheet of fastener material with lanes or islands of resin on one side, each lane or island carrying engageable fastener elements. Such a product may be spooled for later processing, or fed directly into a ferromagnetic strip application station 92, as shown. As an alternative to molding lanes of resin directly onto the sheet, preformed lanes of fastener material may be adhesively bonded to the sheet, particularly to a sheet in the form of a resin film.

Figure 17:
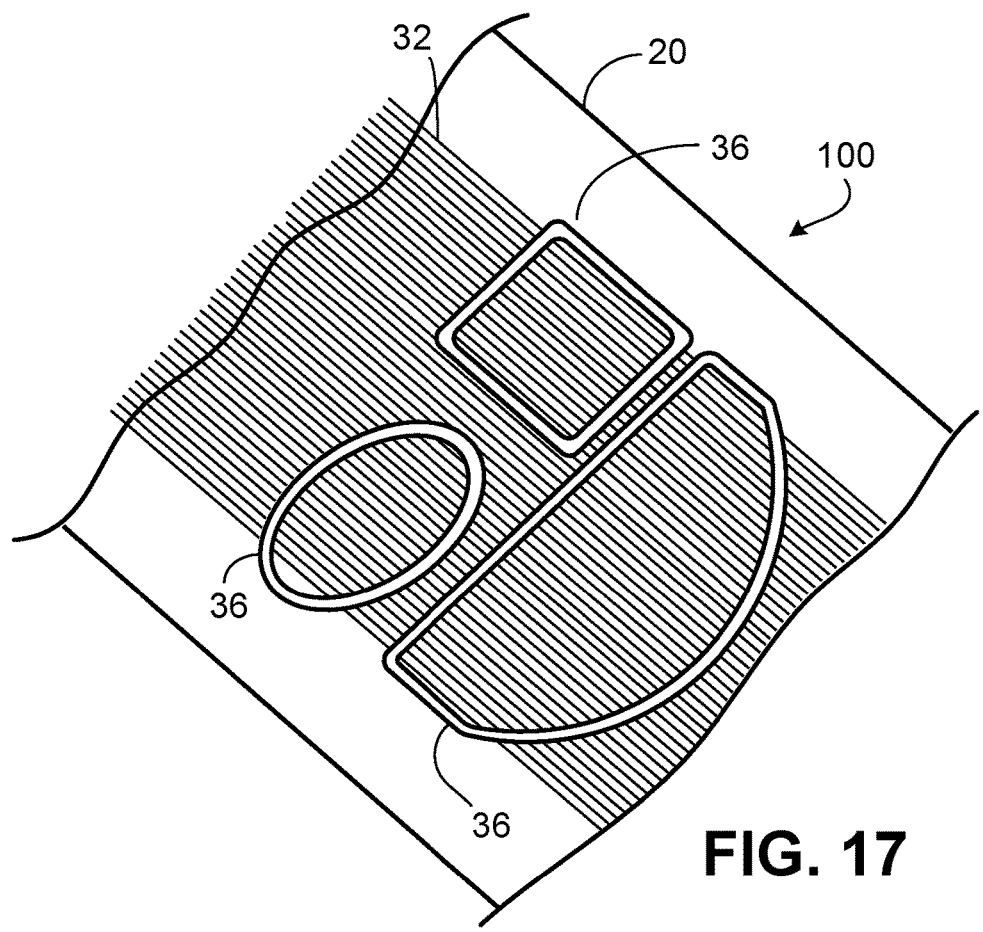
FIG. 17 is a perspective view of a portion of a continuous fastener product produced on the apparatus of FIG. 16.

In station 92, flowable ferromagnetic strip material is sprayed onto the fastening side of the product through a recirculating template belt 94, with excess material scraped from the surface of the belt between passes. The belt is driven to move at the same speed as the product during spraying and until the belt is stripped away from the product to leave the solidifying ferromagnetic strips on the surface of the product. After passing through a heater 95 (or UV curing oven, in the case of a UV-curable material), the product may then pass through a spaced nip (not shown) to slightly compress the cooling ferromagnetic strips to have flat upper surfaces and consistent thickness to serve as foam barriers. From here the product moves through a die-cutting nip between rolls 96 and 98, in which the product is at least partially severed about the outer perimeter of each ferromagnetic strip. At this point, product 100 is a longitudinally continuous textile sheet carrying ferromagnetic strips overlaying discrete lanes or island of resin from which fastener elements extend, as illustrated in FIG. 17, each ferromagnetic strip and associated bounded area forming a discrete fastener product that may be separated from the surrounding material and packaged for transport as an individual mold-in product. Alternatively, if the die-cutting only perforates the sheet material but leaves small bridges to the surrounding material at the edges of each product, the continuous sheet may be spooled for later separation of the products.

The ferromagnetic material may be applied directly over the fastener elements, such as to form the ferromagnetic strip shown in FIG. 13, in which the fastener elements are fully embedded. Alternatively, before the product reaches station 92 the fastener elements in areas to be covered by the ferromagnetic material may be removed, either mechanically by cutting them from the surface, or with an ultrasonic horn that causes the resin of those fastening elements to flow into their respective bases while leaving the other fastening elements intact.

The ferromagnetic strip material may be alternatively applied to the surface by other methods, such as screen printing, gravure printing, or even adhering preformed strips of material if of sufficient flexibility. The ferromagnetic strip material may have an elastic resin base encapsulating fine magnetically attractable particles, such as an iron powder. Ferromagnetic strips formed of such material also have the advantage of being readily cut up during disposal of used seat cushions. In some cases, a resin carrier of the ferromagnetic strip material is curable by ultraviolet radiation to which the material is exposed after being applied to the product. An example of a suitable ferromagnetic material that can be sprayed or screen printed onto the fabric is a mixture of Atomet 29 (from Quebec Metal Powders, QC, Ontario) and water based acrylic paint ES 7174 Grey (from Prisa Paint, Mexico), mixed at a 70/30 volumetric ratio.

Figure 18:
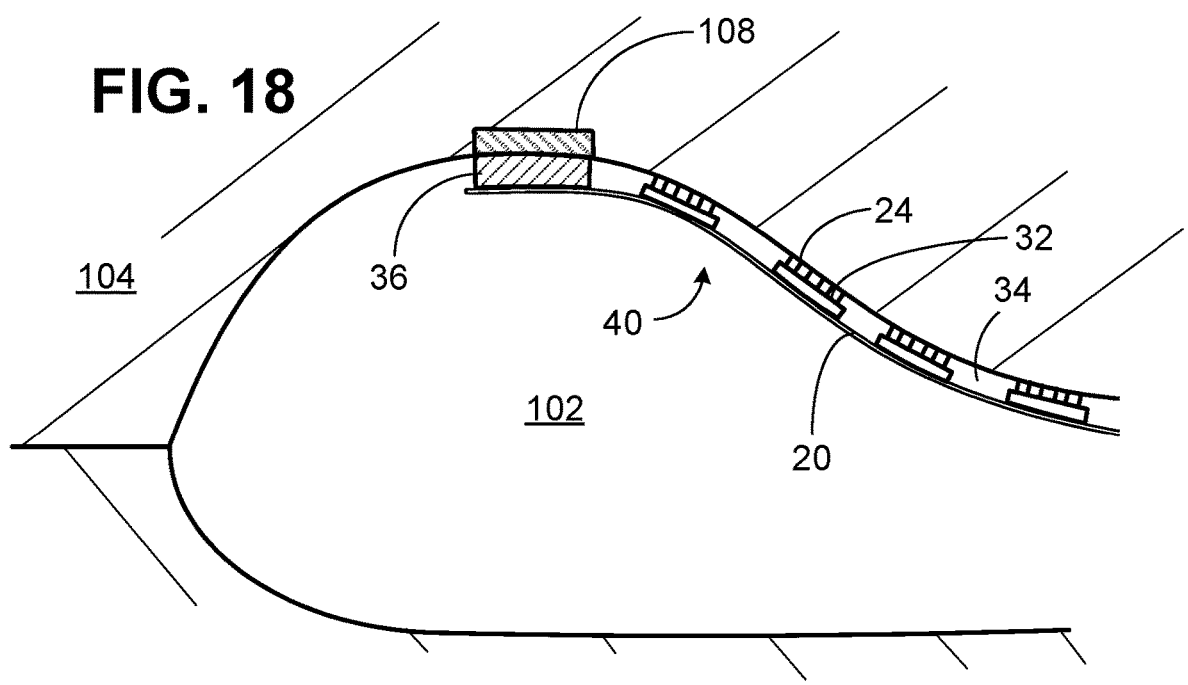
FIG. 18 is a partial cross-sectional view taken through a portion of a seat foam cushion mold cavity.
Figure 19:
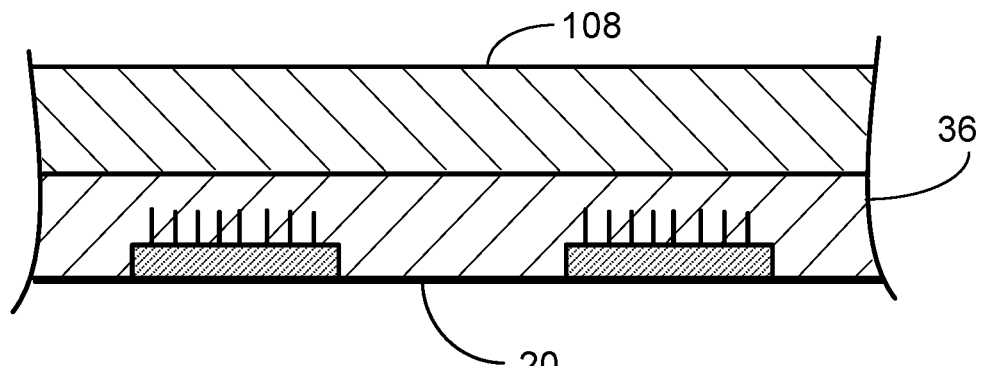
FIG. 19 is a partial cross-sectional view along an edge of a fastener product held against a mold surface by a ferromagnetic strip on the fastening side of the product.

Referring to FIG. 17, if the product is to be spooled for later separation of the individual mold-in fastener products, the ferromagnetic strips may be positioned so as to form all of the fastener products needed for a particular seat cushion in a nested area adjacent one another, so that the products may be stripped from the spool as needed for each seat. In this example, three products are shown forming a nested set corresponding to the three fastener products required to form the seat cushion shown in FIG. 1B. As spooled, the exposed fastener elements on the upper surface of the product can be configured to releasably engage fibers of the textile sheet on the opposite side of the product, to keep the product spooled until use. If the products are to be shipped as separated products, temporary covers can be applied over the fastening area to prevent pre-engagement with the textile fabric of other products. Such covers could be removed and discarded before the product is placed into the mold, or left in place and removed after foaming to further protect the fastener elements from fouling. Additionally, the temporary cover can aid in seat assembly by preventing pre-engagement of the fastener elements to allow positioning of the trim cover. A removable thin sheet or mask can alternatively be placed between the foam seat cushion and the trim cover and be removed after cover positioning Referring next to FIGS. 18 and 19, a foam seat cushion may be formed in a mold cavity 102 defined between two mold halves 104. Before introducing liquid foaming resin into the cavity, a mold-in product such as product 40 is placed against the surface of mold half 104 and held in place by attraction between a permanent magnet 108 embedded in the mold surface and the ferromagnetic strip 36 of the mold-in product. Magnet 108 may be one of a series of such magnets embedded in the mold surface at positions to align with the ferromagnetic strip, to hold the entire perimeter of mold-in product 40 against the mold surface to inhibit foaming resin from intruding into the fastening area of the mold-in product and fouling the fastening elements. The magnet(s) 108 not only hold the product against the mold surface but also help to accurately position the product on the surface. With the mold-in product positioned, the mold cavity is closed and the expanding foaming resin bonds to the exposed back surface of the mold-in product. When the solidified foam seat cushion is pulled from the mold, mold-in product 40 is embedded in its surface and the fastener elements are exposed for engagement with the underside of a seat cover.

Figure 20:
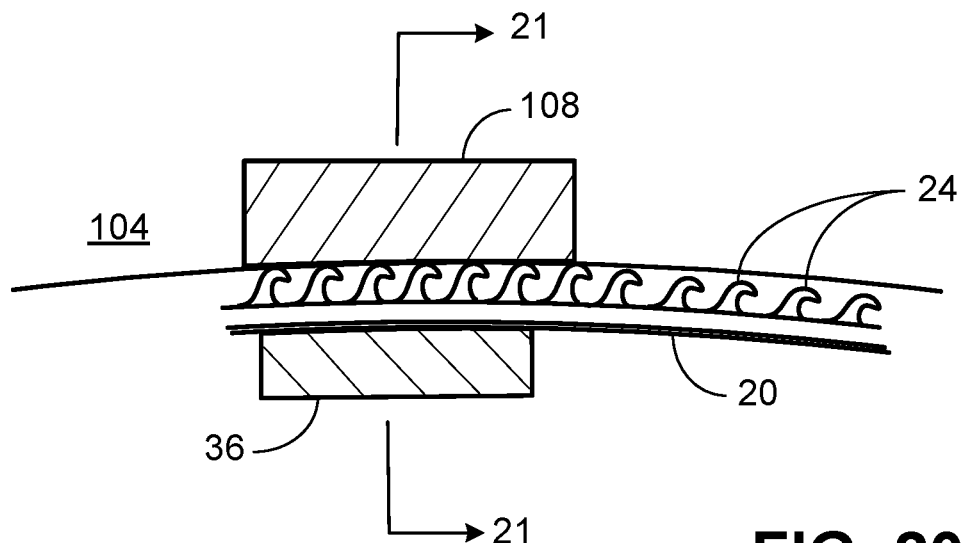
FIG. 20 is a partial cross-sectional view through an edge of a fastener product held against a mold surface by a ferromagnetic strip on the opposite side of the product.
Figure 21:
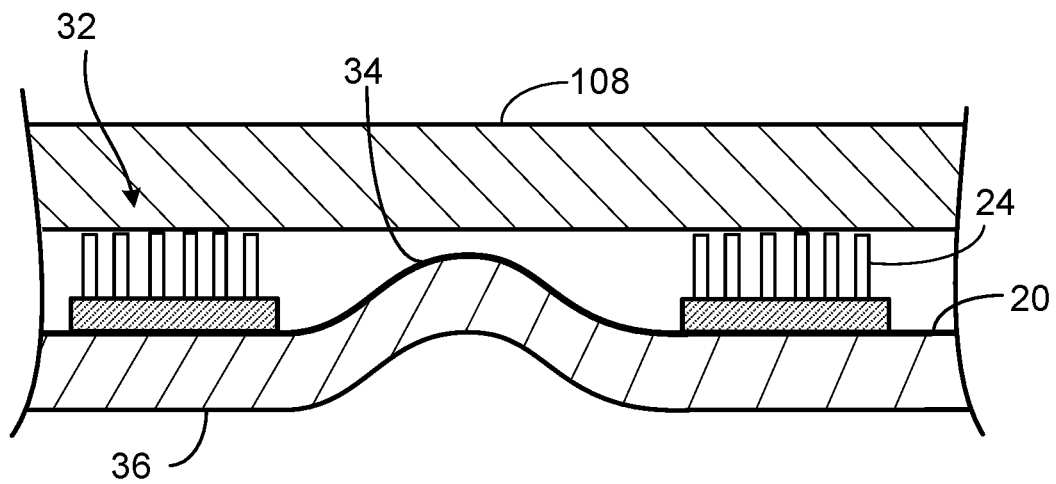
FIG. 21 is a partial cross-sectional view taken along line 21-21 of FIG. 20.

Referring next to FIGS. 20 and 21, a ferromagnetic strip 36 on the obverse side of the mold-in product can also function to hold the fastening side of the product against the mold surface, by attraction to the embedded magnet 108, sufficiently to inhibit foam intrusion enough to leave the vast majority of fastener elements within the fastening area unfouled. Where the ferromagnetic 36 strip crosses a resin lane 34 with fastener elements 24 (FIG. 20), the fastener element heads are held tightly against the mold surface, leaving only the gaps between fastener elements 24 exposed to the flow of foaming resin. These gaps together form a constrained flow path, allowing some foaming resin to penetrate into the fastening area but not enough to foul too many of the fastener elements. Where the ferromagnetic strip 36 crosses a fabric lane 34 (FIG. 21), the portion of ferromagnetic strip underlying the fabric lane draws the fabric lane toward the magnet 108, reducing the flow area at the fabric lane. In some cases the combined fabric and ferromagnetic strip are sufficiently flexible that the fabric lane, if of sufficient width, will actually contact the mold surface, leaving only small flow areas adjacent the resin lanes.

Figure 22:
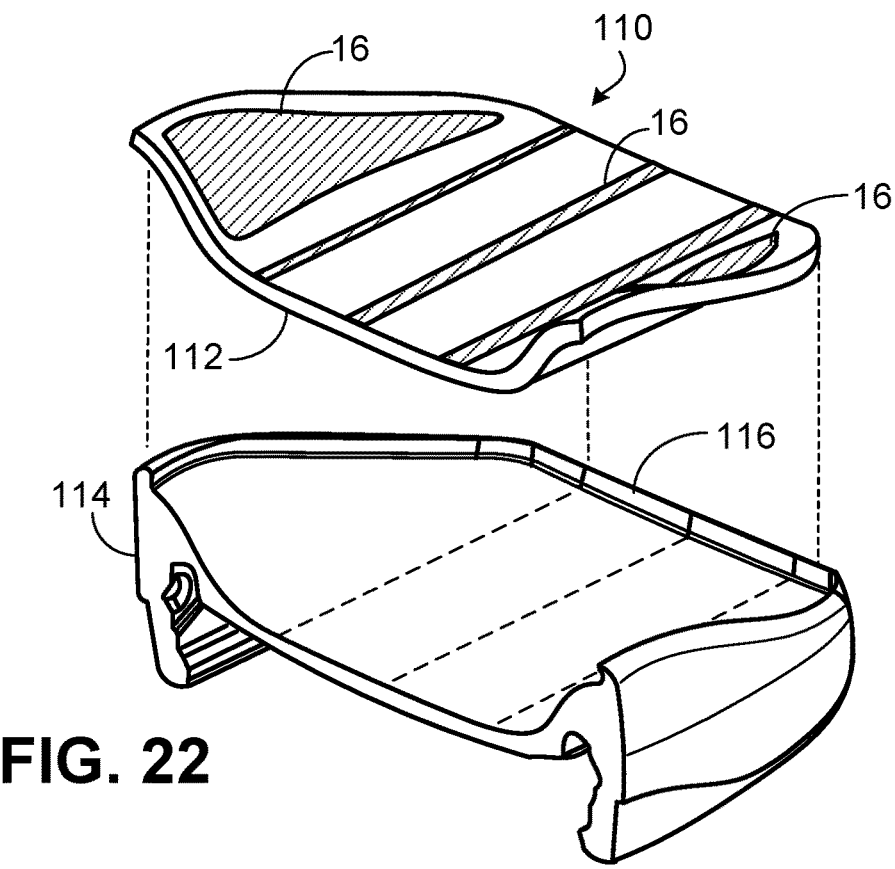
FIG. 22 is an exploded view of a seat cushion, with a molded foam cushion base and a foam topper pad with fastening areas.

Referring next to FIG. 22, in some cases the processes described above are employed to form a molded topper pad 110 with an upper surface featuring fastening areas 16 as described above, each of which has a respective border and may contain spaced lanes or islands of fastening hooks surrounded by or alternating with exposed substrate material. In some cases, the substrate material also forms the upper surface of the topper pad between the fastening areas. The topper pad 110 is molded to have a non-planar shape, such as by forming the topper pad in a shaped foaming cavity in which the fastener material, as either separate substrates each carrying the spaced-apart lanes or islands of hooks and the border forming one fastener area 16, or as a single substrate carrying all of the elements of all of the fastening areas 16 and sized to form the upper surface of the topper pad, is placed and held by magnets as the foam body 112 of the topper pad is formed. The molded topper pad 110 is removed from the mold and attached, such as by flame lamination or spray adhesive, to the foam cushion base 114 to form the seat cushion. In some cases a film is adhered to the underside of the foam topper pad before adhesive bonding of the topper pad to the cushion base. A pressure-sensitive adhesive may be provided on the film, with a release liner that is removed just prior to attaching the topper pad to the cushion base. The cushion base 114 may define a recess bounded by a lip 116 and sized to receive the foam topper pad 110 such that the topper pad is recessed within the final seat cushion.

The topper pad may form substantially all of the seating surface of the final cushion, as shown in FIG. 22, or may form discrete inserts. In this manner the foam material of the topper pad may be selected to have different structural properties than the foam of the rest of the cushion. For example, such a fastening topper pad may be of a softer, more resilient polyurethane foam than the cushion base. It may cover, for example, only the relatively flat central seating area between cushion bolsters. The nominal foam thickness of the topper pad may be, for example, 5 to 25 mm, and because the topper pad is molded to a particular shape, the thickness may vary across the pad, with greater thickness in areas in which a softer feel is desired. The topper pad foam is preferably an open cell polyurethane with a foam density of 25 to 65 kilograms per cubic meter, for example.

Figure 23:
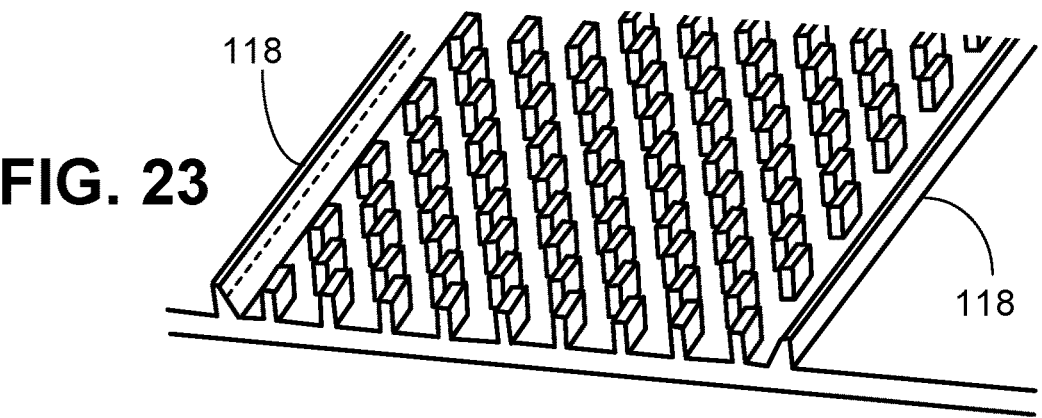
FIGS. 23 and 24 are enlarged perspective views of portions of fastener products with stiffening ribs extending along edges of an array of touch fastener elements.
Figure 24:
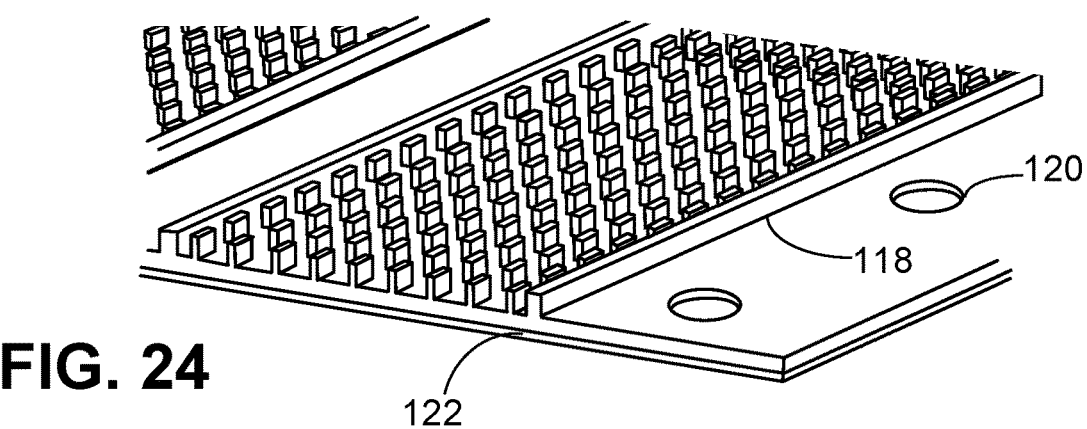

As noted above, the fastening areas of the products discussed herein can be configured to provide a desired level of bending stiffness in the final seat cushion surface. In many instances, the molded arrays of hooks will be configured to avoid abrupt changes in stiffness, and to not significantly increase the seat cushion surface stiffness, to avoid stress concentrations that might cause the fibrous underside of the seat cover to separate from the male fastener elements. Incorporating a foam topper pad or plus pad of a desired surface stiffness can also help achieve a desired stiffness profile across the cushion. The fastener areas can also be designed to increase the surface bending stiffness in desired areas, to provide a desired cushion loading response or simply to reduce any tendency toward waviness in the finished product. Referring to FIGS. 23 and 24, lanes of male fastener elements (illustrated in these two figures as vertical blocks for simplicity) can be molded to include stiffening ribs 118, running the length of the lane, to increase the bending stiffness of the product about an axis running along the product and perpendicular to the lane. The ribs could run along the lane between fastener elements, or along the edges of the lanes as shown in these examples. The ribs could be of any desired shape that is readily demolded, such as the rectangular shape shown in FIG. 24 or the wedge shape shown in FIG. 23. The wedge shape, with angled surface facing the fastener elements, may help to direct loops of the seat cover toward the hooks for engagement.

As discussed above, the area between the lanes may be of exposed substrate onto which the resin of the fastener elements and ribs is molded, or could be a molded resin surface. In some cases, no separate substrate is provided and the entire base of the fastener product is formed of the same resin from which the fastener elements and ribs are molded (e.g., using a roll molding apparatus as shown in FIG. 16 but without introducing any substrate 20 to the nip). In such cases, the stiffness of the product can be varied as desired across the width and length of any section to be die cut from the remainder to form a fastening area insert, by selectively molding ribs and other protrusions on the surface in desired areas and by removing material in other areas after molding, such as by die cutting areas of holes through the molded base. For example, the fastener product shown in FIG. 24 features both stiffening ribs 118 and flexure-enhancing holes 120. A thin film 122 may be laminated across the back surface of the product, including across holes 120, to provide a good foam bonding surface and to prevent intrusion of foam to the fastening side of the product when the product is used as an insert during cushion or topper pad foaming. The film can be, for example, a 0.01 mm PET film laminated as a backing to whatever material (e.g., polypropylene non-woven web or molded fastener resin) forms the web of the product.

Referring back to FIG. 22, in another example a topper pad 110 is instead inserted into a mold in which the cushion base is formed, such that the topper pad is permanently bonded to the foam of the cushion base during molding of the cushion base. In this example the topper pad could be formed, such as by molding or by thermoforming of the fastener product on its surface, to have a non-planar shape before being inserted into the cushion-molding cavity. Alternatively, a planar foam topper pad can be bent into the desired shape by the attractive force of magnets in the mold surface acting on the magnetically attractable fastener area borders, and held in place during cushion foaming. In this case, the foam layer of the topper pad may form the substrate carrying the fastener areas, without the inclusion of any non-woven substrate. In either of these two examples, a layer of film is preferably provided on the non-fastening surface, and in the other non-fastening areas, of the topper pad to inhibit penetration of the cushion foam during molding.

While a number of examples have been described for illustration purposes, the foregoing description is not intended to limit the scope of the invention, which is defined by the scope of the appended claims. There are and will be other examples and modifications within the scope of the following claims.

What is claimed is:

1. A fastener product comprising
a flexible substrate;
a resin layer covering only part of one side of the flexible substrate and leaving a region of the one side of the flexible substrate exposed, the resin layer carrying multiple touch fastener elements each having a resin stem extending integrally from the layer away from the flexible substrate to an engageable head; and
a flexible ferromagnetic strip bonded to the flexible substrate and at least partially bounding a bounded portion of the flexible substrate containing at least some of the touch fastener elements and at least a part of the exposed region.

2. The fastener product of claim 1, wherein the ferromagnetic strip is disposed between lateral edges of the flexible substrate and the bounded portion.

3. The fastener product of claim 1, wherein the ferromagnetic strip is disposed about a perimeter of the flexible substrate.

4. The fastener product of claim 1, wherein the ferromagnetic strip is positioned and configured to restrict intrusion of foam with the strip holding the fastener product against a mold surface.

5. The fastener product of claim 1, wherein the part of the exposed region extends across an extent of the bounded portion.

6. The fastener product of claim 1, wherein the flexible substrate comprises a non-woven textile material.

7. The fastener product of claim 1, wherein the resin layer comprises multiple parallel lanes of resin, each resin lane carrying touch fastener elements, with each pair of adjacent lanes separated by a lane of exposed flexible substrate.

8. The fastener product of claim 7, wherein the flexible substrate is elastic in a direction transverse to the lanes of resin.

9. The fastener product of claim 7, wherein each lane of exposed flexible substrate is of a width, in a direction transverse to the lanes, less than 8 percent of an extent of the bounded portion in a direction transverse to the lanes.

10. The fastener product of claim 1, wherein the resin layer comprises multiple discrete islands of resin, each resin island carrying touch fastener elements, with adjacent islands separated by exposed flexible substrate.

11. The fastener product of claim 1, wherein the ferromagnetic strip is disposed on the same side of the flexible substrate as the touch fastener elements.

12. The fastener product of claim 1, wherein a ratio of minimum to maximum lateral orthogonal dimensions of the bounded portion is between 0.3 and 1.0.

13. The fastener product of claim 1, wherein the touch fastener elements extend to an overall height of between 0.13 and 1.6 mm from the resin layer.

14. The fastener product of claim 1, wherein the fastener product is spooled into roll form, with multiple ferromagnetic strips bounding respective, spaced apart areas along a continuous flexible substrate.

15. The fastener product of claim 1, wherein the resin layer comprises one or more stiffening ribs of resin extending away from the substrate, in addition to the touch fastener elements, the one or more ribs positioned to locally increase a bending stiffness of the fastener product.

16. The fastener product of claim 1, further comprising a layer of foam permanently attached to a side of the flexible substrate opposite the touch fastener elements.

17. A mold in fastener product comprising
a flexible substrate;
a flexible ferromagnetic strip extending from the one side of the flexible substrate and at least partially bounding a bounded area of the flexible substrate;
multiple parallel lanes of resin disposed within the bounded area and carried on the flexible substrate, each resin lane carrying touch fastener elements each having a resin stem extending integrally from the layer away from the flexible substrate to an engageable head, with each pair of adjacent lanes separated by a lane of exposed substrate surface;
wherein the ferromagnetic strip crosses the parallel lanes of resin of at least one pair of adjacent lanes and the lane of exposed substrate surface separating the at least one pair of adjacent lanes.

18. The fastener product of claim 17, wherein the strip is disposed about an outer perimeter of the fastener product.

19. The fastener product of claim 17, wherein a portion of the strip is disposed between a lateral edge of the flexible substrate and the bounded area.

20. The fastener product of claim 17, wherein the lane of exposed substrate surface extends across an extent of the bounded area.

21. The fastener product of claim 17, wherein the flexible substrate comprises a non-woven textile material.

22. The fastener product of claim 17, wherein the flexible substrate is elastic in a direction transverse to the lanes of resin.

23. The fastener product of claim 17, wherein the ferromagnetic strip is disposed on an opposite side of the flexible substrate as the touch fastener elements.

24. The fastener product of claim 17, wherein the minimum lateral dimension of the bounded area is at least 50 mm.

25. The fastener product of claim 17, wherein the fastener product is spooled into roll form, with multiple ferromagnetic strips bounding respective, spaced apart areas along a continuous flexible substrate.

* * * * *